(12) United States Patent
Kommula et al.

(10) Patent No.: US 10,673,761 B2
(45) Date of Patent: Jun. 2, 2020

(54) METHODS AND APPARATUS TO IMPROVE PACKET FLOW AMONG VIRTUALIZED SERVERS

(71) Applicant: VMware, Inc., Palo Alto, CA (US)

(72) Inventors: Raja Kommula, Palo Alto, CA (US); Raj Yavatkar, Palo Alto, CA (US); Thayumanavan Sridhar, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 31 days.

(21) Appl. No.: 15/720,684

(22) Filed: Sep. 29, 2017

(65) Prior Publication Data

US 2019/0104069 A1    Apr. 4, 2019

(51) Int. Cl.
*H04L 12/803* (2013.01)
*H04L 12/721* (2013.01)
*H04L 12/713* (2013.01)
*H04L 12/26* (2006.01)
*H04L 12/24* (2006.01)
*G06F 9/455* (2018.01)
*H04L 12/813* (2013.01)
(Continued)

(52) U.S. Cl.
CPC ........ *H04L 47/125* (2013.01); *G06F 9/45558* (2013.01); *H04L 41/0893* (2013.01); *H04L 43/0876* (2013.01); *H04L 45/586* (2013.01); *H04L 45/70* (2013.01); *G06F 2009/45591* (2013.01); *G06F 2009/45595* (2013.01); *H04L 43/0817* (2013.01); *H04L 45/125* (2013.01); *H04L 45/7453* (2013.01); *H04L 47/20* (2013.01)

(58) Field of Classification Search
CPC ....... H04L 47/125; H04L 45/64; H04L 12/66; H04L 12/4633; H04L 45/74; H04L 41/0806; H04L 45/586; H04L 49/70; H04L 45/70; H04L 45/125; H04L 45/7453; H04L 41/0893; H04L 43/0876; H04L 43/0817; H04L 47/20; G06F 9/45558; G06F 2009/45595; G06F 2009/45591
USPC ........................................................ 370/235
See application file for complete search history.

(56) References Cited

U.S. PATENT DOCUMENTS

2014/0003233 A1*    1/2014    Rune ................... H04L 47/125
                                                                370/230
2016/0330236 A1*   11/2016    Reddy ................ H04L 63/1466
(Continued)

*Primary Examiner* — Faisal Choudhury
(74) *Attorney, Agent, or Firm* — Hanley, Flight & Zimmerman, LLC

(57) ABSTRACT

Methods, apparatus, systems, and articles of manufacture to optimize or otherwise improve packet flow among virtualized servers are disclosed and described. An example apparatus includes a load balance list generator to identify abstracted network resources in a virtualized network based on a utilization status parameter of the abstracted network resources, generate a load balance list including the identified abstracted network resources, the load balance list including a number of the abstracted network resources satisfying a threshold, and generate a network routing configuration for data packets in the virtualized network based on the generated load balance list. The example apparatus further includes a policy adjustor to adjust a policy of a physical hardware resource corresponding to one of the one or more abstracted network resources based on the network routing configuration to distribute a packet flow among the abstracted network resources.

21 Claims, 12 Drawing Sheets

(51) Int. Cl.
  *H04L 12/729* (2013.01)
  *H04L 12/743* (2013.01)

(56) References Cited

U.S. PATENT DOCUMENTS

2017/0019430 A1* 1/2017 Cohn .................. H04L 65/1036
2017/0118067 A1* 4/2017 Vedula ................ H04L 41/0668
2018/0097734 A1* 4/2018 Boutros ................ H04L 47/125
2019/0021016 A1* 1/2019 Radmand ............. H04W 24/08

* cited by examiner

```
while (true)
    ecmp_set = { }
    ecmp_size = 0;
    all_esg_set = { ESGs }           /* { E1, E2, ... , E8 } */
    host_load_set = { Load on ESG Hosts }
    N = all_esg_set.size( )

quick_sort (host_load_set)

for each H in host_load_set
        /* Add at least 50% of ESGs regardless of their load */
        if (ecmp_size <= N/2)
            E = get_esg (H)
            ecmp_set.add (E)
            ecmp_size++
        elseif (host_load (H) < THIRTY_PERCENT)
        /* Add additional ESGs if they are lightly loaded */ ecmp_set.add(E)
            ecmp_size++
        endif
    endfor update ECMP on TOR using ecmp_set
    sleep (30)
endwhile
```

FIG. 11

METHODS AND APPARATUS TO IMPROVE PACKET FLOW AMONG VIRTUALIZED SERVERS

FIELD OF THE DISCLOSURE

This disclosure relates generally to cloud computing and, more particularly, to methods and apparatus to optimize packet flow among virtualized servers.

BACKGROUND

Virtualizing computer systems provides benefits such as the ability to execute multiple computer systems on a single hardware computer, replicating computer systems, moving computer systems among multiple hardware computers, and so forth. "Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may be composed of many processing units (e.g., servers, computing resources, etc.). The processing units may be installed in standardized frames, known as racks, which provide efficient use of floor space by allowing the processing units to be stacked vertically. The racks may additionally include other components of a cloud computing environment such as storage devices, networking devices (e.g., routers, switches, etc.), etc.

BRIEF DESCRIPTION OF THE DRAWINGS

FIG. 11 illustrates example source code representative of example computer readable instructions that may be executed to implement the example packet flow improver of FIGS. 6-7 that may be used to implement the examples disclosed herein.

DETAILED DESCRIPTION

Figure 1:
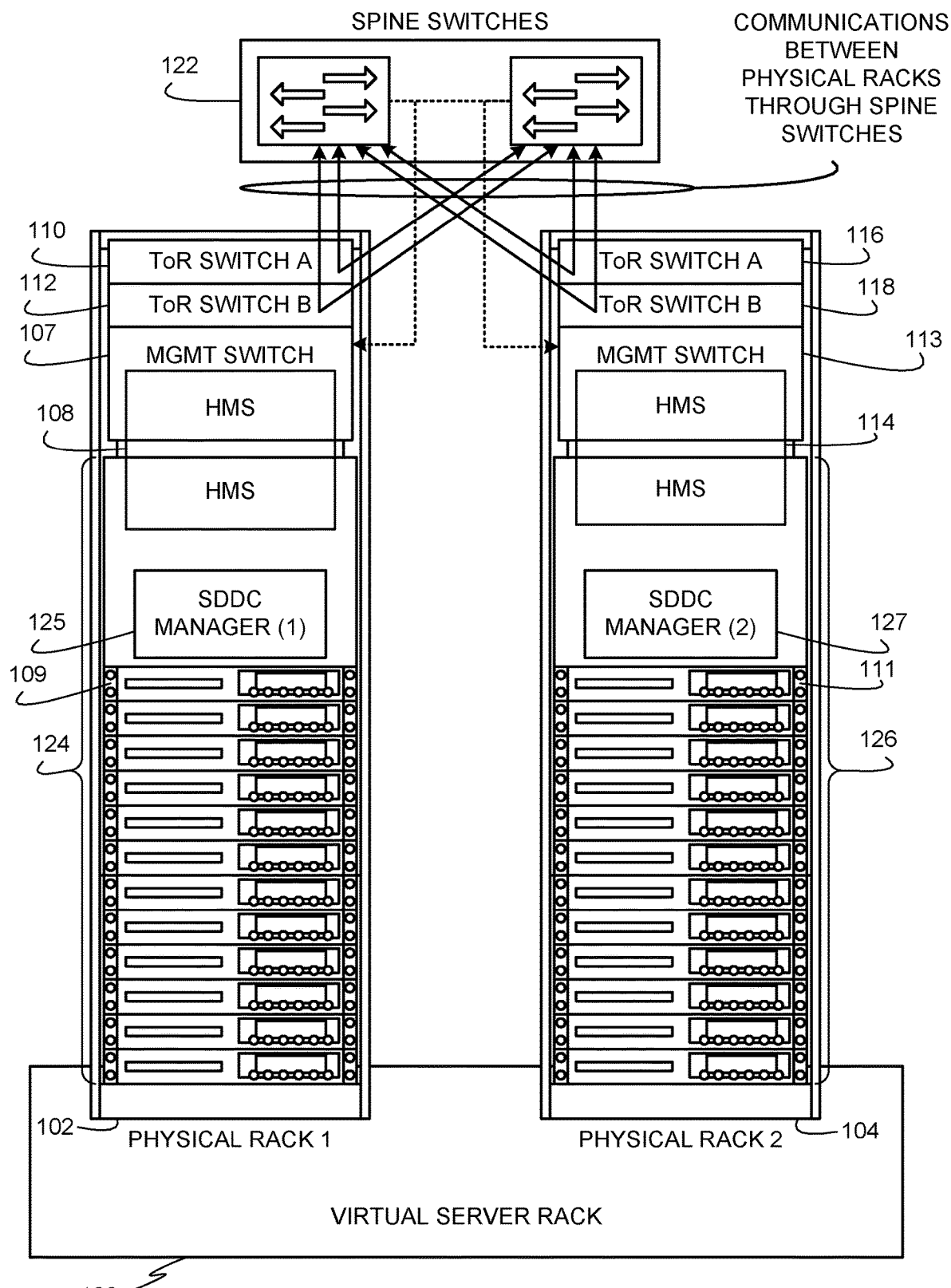
FIG. 1 illustrates example physical racks in an example virtual server rack deployment.

Cloud computing is based on the deployment of many physical resources across a network, virtualizing the physical resources into virtual resources, and provisioning the virtual resources in software defined data centers (SDDCs) for use across cloud computing services and applications. Examples disclosed herein can be used to manage network resources in SDDCs to improve performance and efficiencies of network communications between different virtual and/or physical resources of the SDDCs.

Examples described herein can be used in connection with different types of SDDCs. In some examples, techniques described herein are useful for managing network resources that are provided in SDDCs based on Hyper-Converged Infrastructure (HCI). In some examples, HCI combines a virtualization platform such as a hypervisor, virtualized software-defined storage, and virtualized networking in an SDDC deployment. An SDDC manager can provide automation of workflows for lifecycle management and operations of a self-contained private cloud instance. Such an instance may span multiple racks of servers connected via a leaf-spine network topology and connects to the rest of the enterprise network for north-south connectivity via well-defined points of attachment. The leaf-spine network topology is a two-layer data center topology including leaf switches (e.g., switches to which servers, load balancers, edge routers, storage resources, etc., connect) and spine switches (e.g., switches to which leaf switches connect, etc.). In such a topology, the spine switches form a backbone of a network, where every leaf switch is interconnected with each and every spine switch.

Examples described herein can be used with one or more different types of virtualization environments. Three example types of virtualization environments are: full virtualization, paravirtualization, and operating system (OS) virtualization. Full virtualization, as used herein, is a virtualization environment in which hardware resources are managed by a hypervisor to provide virtual hardware resources to a virtual machine (VM). In a full virtualization environment, the VMs do not have access to the underlying hardware resources. In a typical full virtualization, a host OS with embedded hypervisor (e.g., a VMWARE® ESXI® hypervisor, etc.) is installed on the server hardware. VMs including virtual hardware resources are then deployed on the hypervisor. A guest OS is installed in the VM. The hypervisor manages the association between the hardware resources of the server hardware and the virtual resources allocated to the VMs (e.g., associating physical random-access memory (RAM) with virtual RAM, etc.). Typically, in full virtualization, the VM and the guest OS have no visibility and/or access to the hardware resources of the underlying server. Additionally, in full virtualization, a full guest OS is typically installed in the VM while a host OS is installed on the server hardware. Example virtualization environments include VMWARE® ESX® hypervisor, Microsoft HYPER-V® hypervisor, and Kernel Based Virtual Machine (KVM).

Paravirtualization, as used herein, is a virtualization environment in which hardware resources are managed by a hypervisor to provide virtual hardware resources to a VM, and guest OSs are also allowed to access some or all the underlying hardware resources of the server (e.g., without accessing an intermediate virtual hardware resource, etc.). In a typical paravirtualization system, a host OS (e.g., a Linux-based OS, etc.) is installed on the server hardware. A hypervisor (e.g., the XEN® hypervisor, etc.) executes on the host OS. VMs including virtual hardware resources are then deployed on the hypervisor. The hypervisor manages the association between the hardware resources of the server hardware and the virtual resources allocated to the VMs (e.g., associating RAM with virtual RAM, etc.). In paravirtualization, the guest OS installed in the VM is configured also to have direct access to some or all of the hardware resources of the server. For example, the guest OS can be precompiled with special drivers that allow the guest OS to access the hardware resources without passing through a virtual hardware layer. For example, a guest OS can be precompiled with drivers that allow the guest OS to access a sound card installed in the server hardware. Directly accessing the hardware (e.g., without accessing the virtual hardware resources of the VM, etc.) can be more efficient, can allow for performance of operations that are not supported by the VM and/or the hypervisor, etc.

OS virtualization is also referred to herein as container virtualization. As used herein, OS virtualization refers to a system in which processes are isolated in an OS. In a typical OS virtualization system, a host OS is installed on the server hardware. Alternatively, the host OS can be installed in a VM of a full virtualization environment or a paravirtualization environment. The host OS of an OS virtualization system is configured (e.g., utilizing a customized kernel, etc.) to provide isolation and resource management for processes that execute within the host OS (e.g., applications that execute on the host OS, etc.). The isolation of the processes is known as a container. Thus, a process executes within a container that isolates the process from other processes executing on the host OS. Thus, OS virtualization provides isolation and resource management capabilities without the resource overhead utilized by a full virtualization environment or a paravirtualization environment. Example OS virtualization environments include Linux Containers LXC and LXD, the DOCKER™ container platform, the OPENVZ™ container platform, etc.

In some examples, a data center (or pool of linked data centers) can include multiple different virtualization environments. For example, a data center can include hardware resources that are managed by a full virtualization environment, a paravirtualization environment, an OS virtualization environment, etc., and/or a combination thereof. In such a data center, a workload can be deployed to any of the virtualization environments. In some examples, techniques to monitor both physical and virtual infrastructure provide visibility into the virtual infrastructure (e.g., VMs, virtual storage, virtual or virtualized networks and their control/management counterparts, etc.) and the physical infrastructure (e.g., servers, physical storage, network switches, etc.).

Examples described herein can be employed with HCI-based SDDCs deployed using virtual server rack systems such as the virtual server rack 106 of FIG. 1. A virtual server rack system can be managed using a set of tools that is accessible to all modules of the virtual server rack system. Virtual server rack systems can be configured in many different sizes. Some systems are as small as four hosts, and other systems are as big as tens of racks. As described in more detail below in connection with FIGS. 1 and 2, multi-rack deployments can include Top-of-the-Rack (ToR) switches (e.g., leaf switches, etc.) and spine switches connected using a Leaf-Spine architecture. A virtual server rack system also includes software-defined data storage (e.g., storage area network (SAN), VMWARE® VIRTUAL SAN™, etc.) distributed across multiple hosts for redundancy and virtualized networking software (e.g., VMWARE NSX™, etc.).

A drawback of some virtual server rack systems is that different hardware components located therein can be procured from different equipment vendors, and each equipment vendor can have its own independent OS (OS) installed on its hardware. For example, physical hardware resources include white label equipment such as white label servers, white label network switches, white label external storage arrays, and white label disaggregated rack architecture systems (e.g., Intel's Rack Scale Architecture (RSA), etc.). White label equipment is computing equipment that is unbranded and sold by manufacturers to system integrators that install customized software, and possibly other hardware, on the white label equipment to build computing/network systems that meet specifications of end users or customers. The white labeling, or unbranding by original manufacturers, of such equipment enables third-party system integrators to market their end-user integrated systems using the third-party system integrators' branding.

In some examples, virtual server rack systems additionally manage non-white label equipment such as original equipment manufacturer (OEM) equipment. Such OEM equipment includes OEM Servers such as HEWLETT-PACKARD® (HP®) servers and LENOVO® servers, and OEM Switches such as switches from ARISTA NETWORKS™, and/or any other OEM server, switches, or equipment. In any case, each equipment vendor can have its own independent OS installed on its hardware. For example, ToR switches and spine switches can have OSs from vendors like CISCO® and ARISTA NETWORKS, while storage and compute components may be managed by a different OS. Each OS actively manages its hardware at the resource level but there is no entity across all resources of the virtual server rack system that makes system-level runtime decisions based on the state of the virtual server rack system. For example, if a hard disk malfunctions, storage software has to reconfigure existing data into the remaining disks. This reconfiguration can require additional network bandwidth, which may not be released until the reconfiguration is complete.

Examples described herein provide HCI-based SDDCs with system-level governing features that can actively monitor and manage different hardware and software components of a virtual server rack system even when such different hardware and software components execute different OSs. As described in connection with FIG. 2, major components of a virtual server rack system can include a hypervisor, network virtualization software, storage virtualization software (e.g., software-defined data storage, etc.), a physical network OS, and external storage. In some examples, the storage virtualization (e.g., VMWARE VIRTUAL SAN™, etc.) is integrated with the hypervisor. In examples in which the physical network OS is isolated from the network virtualization software, the physical network is not aware of events occurring in the network virtualization environment and the network virtualization environment is not aware of events occurring in the physical network.

In prior systems, packet flows between host clusters (e.g., East-West flow) and/or between a customer network and the host clusters (e.g., North-South flow) can be implemented using Layer 2 (L2) network fabric, Layer 3 (L3) network fabric, etc. For example, when North-South packet flows or uplinks are L3, equal-cost multi-path (ECMP) packet flow paths are added on leaf switches to distribute packet flows across multiple VMWARE NSX™ Edge Service Gateway (ESG) VMs present in a management cluster. ECMP is a routing strategy where next-hop packet forwarding to a single destination can occur over multiple next-hop addresses which tie for top place in routing metric calculations. For example, a router can determine the multiple next-hop addresses and place the multiple next-hop addresses in an ECMP set. In such an example, the router can use a hash algorithm (e.g., an ECMP hash algorithm, etc.) where parameters (e.g., configuration parameters, etc.) of the hash algorithm are based on a routing hash policy (e.g., an ECMP routing hash policy, etc.) to choose one of the next-hop addresses in the ECMP set to install in a forwarding table or a routing table of the router. For example, an ECMP routing hash policy can include a routing table including a list of network resources such as ESGs in a communication network. For example, adjusting an ECMP routing hash policy can include updating a routing table used by the ECMP routing hash policy to execute packet flows in a network (e.g., a physical network, a virtual network, etc.).

In some examples, communication networks can utilize ECMP to implement load balancing of packet flows across network resources. For example, a leaf switch can use ECMP load balancing as a forwarding mechanism to distribute traffic across multiple links based on L3 routing information. In some examples, if a router discovers multiple paths to a destination, a routing table included in the router is updated with multiple entries for that destination, where an ECMP routing hash policy can select one of the multiple entries in the routing table when a new data packet is received for forwarding. ECMP load balancing allows the router to use multiple paths to help achieve load sharing across multiple source-destination host pairs. A benefit to ECMP load balancing is that incoming packet flows can be evenly distributed across multiple equal-cost connections.

In some other examples, when North-South uplinks are L2, packet flows cannot be distributed equally among the ESG VMs. For example, in an L2 uplink, destination media access control (MAC) addresses of data packets in a packet flow include a MAC address of only one ESG. In such an example, all of the data packets are transmitted to a single ESG and, thus, reduce a North-South bandwidth to a bandwidth of the single ESG regardless of how many ESGs are operating in a network. In some examples, a North-South bandwidth in a non-virtualized network can be improved by using L2 ECMP. For example, L2 ECMP can be achieved by using protocols such as Cisco® FabricPath, Transparent Interconnection of Lots of Links (TRILL), or Distributed Computing Environment/Remote Procedure Calls (DCE/RPC). However, these protocols require specialized hardware and are not designed to work in a virtualized overlay network such as the example virtualized networks described herein.

Examples disclosed herein improve packet flow among virtualized servers of prior systems by adjusting a packet flow path in L2 network fabrics based on a status of available routing resources (e.g., ESGs, etc.). In disclosed examples herein, the packet flow path can be adjusted by identifying a source and a destination of the packet flow and adjusting one or more packet flow policies to optimize and/or otherwise improve the available routing resources abilities to execute packet flows. As used herein, the term "packet flow path" refers to one or more physical or virtualized network switches such as ToR switches, spine switches, edge services gateways (ESGs), etc., between a source and a destination of a transmitted data packet. As used herein, the term "packet flow" refers to one or more data packets being transmitted from a source to a destination. For example, a packet flow may include a VM migration, a significantly large continuous flow (e.g., an elephant flow, etc.), etc.

In some examples disclosed herein, an ESG load balance list is generated including one or more abstracted network resources corresponding to one or more physical hardware resources. In such examples, a list of ESGs in a virtualized network is generated and ESG monitoring information (e.g., central processing unit (CPU) utilization, network availability, switch load utilization, etc.) corresponding to each one of the ESGs is obtained. In some disclosed examples, a number of ESGs is added to the ESG load balance list to satisfy a threshold. For example, four ESGs can be added to the ESG load balance list when there are eight available ESGs in the virtualized network to satisfy a threshold of at least half of the total available ESGs. In some disclosed examples, an ESG is added to the ESG load balance list based on corresponding ESG monitoring information. For example, an ESG can be added to the ESG load balance list when a load utilization of the ESG does not satisfy a threshold (e.g., the CPU utilization and/or the switch utilization is greater than 30%, greater than 50%, etc.). In some disclosed examples, one or more policies of a ToR switch can be adjusted to execute a packet flow based on the generated ESG load balance list. For example, a routing table of a ToR switch can be updated based on the ESG load balance list and, as a result, redistribute a new or existing packet flow among ESGs in the ESG load balance list. In such disclosed examples, an ECMP load balance approach can be applied to L2 network fabrics to optimize and/or otherwise increase a bandwidth of packet flows in a virtualized communication network corresponding to one or more physical hardware resources.

FIG. 1 illustrates example physical racks 102, 104 in an example deployment of a virtual server rack 106. The virtual server rack 106 of the illustrated example enables abstracting hardware resources (e.g., physical hardware resources 124, 126, etc.). In some examples, the virtual server rack 106 includes a set of physical units (e.g., one or more racks, etc.) with each unit including hardware such as server nodes (e.g., compute+storage+network links, etc.), network switches, and, optionally, separate storage units. From a user perspective, the example virtual server rack 106 is an aggregated pool of logic resources exposed as one or more VMWARE ESXI™ clusters along with a logical storage pool and network connectivity. As used herein, the term "cluster" refers to a server group in a virtual environment. For example, a VMWARE ESXI™ cluster is a group of physical servers in the physical hardware resources that run VMWARE ESXI™ hypervisors to virtualize processor, memory, storage, and networking resources into logical resources to run multiple VMs that run OSs and applications as if those OSs and applications were running on physical hardware without an intermediate virtualization layer.

In the illustrated example, the first physical rack 102 has an example ToR Switch A 110, an example ToR Switch B 112, an example management switch 107, and an example server host node(0) 109. In the illustrated example, the management switch 107 and the server host node(0) 109 run a hardware management system (HMS) 108 for the first physical rack 102. The second physical rack 104 of the illustrated example is also provided with an example ToR Switch A 116, an example ToR Switch B 118, an example management switch 113, and an example server host node (0) 111. In the illustrated example, the management switch 113 and the server host node (0) 111 run an HMS 114 for the second physical rack 104.

In the illustrated example, the HMS 108, 114 connects to server management ports of the server host node(0) 109, 111 (e.g., using a baseboard management controller (BMC), etc.), connects to ToR switch management ports (e.g., using 1 gigabits per second (Gbps) links, 10 Gbps links, etc.) of the ToR switches 110, 112, 116, 118, and also connects to spine switch management ports of one or more spine switches 122. In the illustrated example, the ToR switches 110, 112, 116, 118, implement leaf switches such that the ToR switches 110, 112, 116, 118, and the spine switches 122 are in communication with one another in a leaf-spine switch configuration. These example connections form a non-routable private Internet protocol (IP) management network for out-of-band (OOB) management. The HMS 108, 114 of the illustrated example uses this OOB management interface to the server management ports of the server host node(0) 109, 111 for server hardware management. In addition, the HMS 108, 114 of the illustrated example uses this OOB management interface to the ToR switch management ports of the ToR switches 110, 112, 116, 118 and to the spine switch management ports of the one or more spine switches 122 for switch management.

In the illustrated example, the ToR switches 110, 112, 116, 118 connect to server NIC ports (e.g., using 10 Gbps links, etc.) of server hosts in the physical racks 102, 104 for downlink communications and to the spine switch(es) 122 (e.g., using 40 Gbps links, etc.) for uplink communications. In the illustrated example, the management switch 107, 113 is also connected to the ToR switches 110, 112, 116, 118 (e.g., using a 10 Gbps link, etc.) for internal communications between the management switch 107, 113 and the ToR switches 110, 112, 116, 118. Also in the illustrated example, the HMS 108, 114 is provided with in-band (IB) connectivity to individual server nodes (e.g., server nodes in example physical hardware resources 124, 126, etc.) of the physical rack 102, 104. In the illustrated example, the IB connection interfaces to physical hardware resources 124, 126 via an OS running on the server nodes using an OS-specific application programming interface (API) such as VMWARE VSPHERE® API, command line interface (CLI), and/or interfaces such as Common Information Model from Distributed Management Task Force (DMTF).

Example OOB operations performed by the HMS 108, 114 include discovery of new hardware, bootstrapping, remote power control, authentication, hard resetting of non-responsive hosts, monitoring catastrophic hardware failures, and firmware upgrades. The example HMS 108, 114 uses IB management to periodically monitor status and health of the physical hardware resources 124, 126 and to keep server objects and switch objects up to date. Example IB operations performed by the HMS 108, 114 include controlling power state, accessing temperature sensors, controlling Basic Input/Output System (BIOS) inventory of hardware (e.g., CPUs, memory, disks, etc.), event monitoring, and logging events.

The HMSs 108, 114 of the corresponding physical racks 102, 104 interface with software-defined data center (SDDC) managers 125, 127 of the corresponding physical racks 102, 104 to instantiate and manage the virtual server rack 106 using physical hardware resources 124, 126 (e.g., processors, NICs, servers, switches, storage devices, peripherals, power supplies, etc.) of the physical racks 102, 104. In the illustrated example, the SDDC manager 125 of the first physical rack 102 runs on a cluster of three server host nodes of the first physical rack 102, one of which is the server host node(0) 109. In some examples, the term "host" refers to a functionally indivisible unit of the physical hardware resources 124, 126, such as a physical server that is configured or allocated, as a whole, to a virtual rack and/or workload; powered on or off in its entirety; or may otherwise be considered a complete functional unit. Also in the illustrated example, the SDDC manager 127 of the second physical rack 104 runs on a cluster of three server host nodes of the second physical rack 104, one of which is the server host node(0) 111.

In the illustrated example, the SDDC managers 125, 127 of the corresponding physical racks 102, 104 communicate with each other through one or more spine switches 122. Also in the illustrated example, communications between physical hardware resources 124, 126 of the physical racks 102, 104 are exchanged between the ToR switches 110, 112, 116, 118 of the physical racks 102, 104 through the one or more spine switches 122. In the illustrated example, each of the ToR switches 110, 112, 116, 118 is connected to each of two spine switches 122. In other examples, fewer or more spine switches may be used. For example, additional spine switches may be added when physical racks are added to the virtual server rack 106.

The SDDC manager 125 of the first physical rack 102 runs on a cluster of three server host nodes of the first physical rack 102 using a high availability (HA) mode configuration. In addition, the SDDC manager 127 of the second physical rack 104 runs on a cluster of three server host nodes of the second physical rack 104 using the HA mode configuration. Using the HA mode in this manner, enables fault tolerant operation of the SDDC manager 125, 127 in the event that one of the three server host nodes in the cluster for the SDDC manager 125, 127 fails. Upon failure of a server host node executing the SDDC manager 125, 127, the SDDC manager 125, 127 can be restarted to execute on another one of the hosts in the cluster. Therefore, the SDDC manager 125, 127 continues to be available even in the event of a failure of one of the server host nodes in the cluster.

In the illustrated example, a CLI and APIs are used to manage the ToR switches 110, 112, 116, 118. For example, the HMS 108, 114 uses CLI/APIs to populate switch objects corresponding to the ToR switches 110, 112, 116, 118. On HMS bootup, the HMS 108, 114 populates initial switch objects with statically available information. In addition, the HMS 108, 114 uses a periodic polling mechanism as part of an HMS switch management application thread to collect statistical and health data from the ToR switches 110, 112, 116, 118 (e.g., Link states, Packet Stats, Availability, etc.). There is also a configuration buffer as part of the switch object which stores the configuration information to be applied on the switch.

The HMS 108, 114 of the illustrated example of FIG. 1 is a stateless software agent responsible for managing individual hardware resources in a physical rack 102, 104. Examples of hardware elements that the HMS 108, 114 manages are servers and network switches in the physical rack 102, 104. In the illustrated example, the HMS 108, 114 is implemented using Java on Linux so that an OOB management portion of the HMS 108, 114 runs as a Java application on a white box management switch (e.g., the management switch 107, 113, etc.) in the physical rack 102, 104. However, any other programming language and any other OS may be used to implement the HMS 108, 114.

Figure 2:
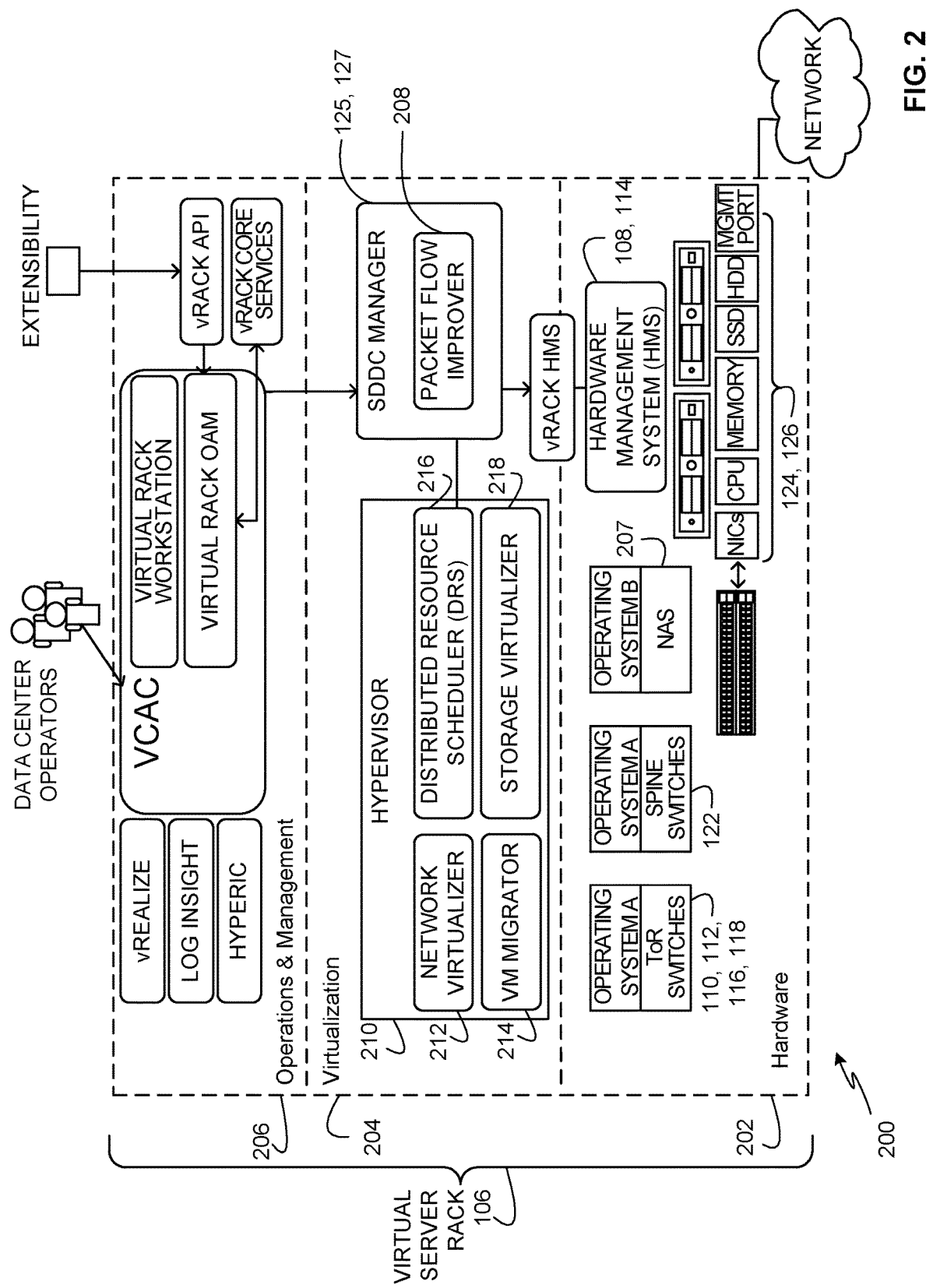
FIG. 2 illustrates an example architecture to configure and deploy the example virtual server rack of FIG. 1.

FIG. 2 depicts an example virtual server rack architecture 200 that may be used to configure and deploy the virtual server rack 106 of FIG. 1. The example architecture 200 of FIG. 2 includes a hardware layer 202, a virtualization layer 204, and an operations and management (OAM) layer 206. In the illustrated example, the hardware layer 202, the virtualization layer 204, and the OAM layer 206 are part of the example virtual server rack 106 of FIG. 1. The virtual server rack 106 of the illustrated example is based on the physical racks 102, 104 of FIG. 1. The example virtual server rack 106 configures the physical hardware resources 124, 126, virtualizes the physical hardware resources 124, 126 into virtual resources, provisions virtual resources for use in providing cloud-based services, and maintains the physical hardware resources 124, 126 and the virtual resources.

The example hardware layer 202 of FIG. 2 includes the HMS 108, 114 of FIG. 1 that interfaces with the physical hardware resources 124, 126 (e.g., processors, NICs, servers, switches, storage devices, peripherals, power supplies, etc.), the ToR switches 110, 112, 116, 118 of FIG. 1, the spine switches 122 of FIG. 1, and network attached storage (NAS) hardware 207. The HMS 108, 114 is configured to manage individual hardware nodes such as different ones of the physical hardware resources 124, 126. For example, managing of the hardware nodes involves discovering nodes, bootstrapping nodes, resetting nodes, processing hardware events (e.g., alarms, sensor data threshold triggers, etc.) and state changes, exposing hardware events and state changes to other resources and a stack of the virtual server rack 106 in a hardware-independent manner. The HMS 108, 114 also supports rack-level boot-up sequencing of the physical hardware resources 124, 126 and provides services such as secure resets, remote resets, and/or hard resets of the physical hardware resources 124, 126.

The HMS 108, 114 of the illustrated example is part of a dedicated management infrastructure in a corresponding physical rack 102, 104 including the dual-redundant management switches 107, 113 and dedicated management ports attached to the server host nodes(0) 109, 111 and the ToR switches 110, 112, 116, 118. In the illustrated example, one instance of the HMS 108, 114 runs per physical rack 102, 104. For example, the HMS 108, 114 can run on the management switch 107, 113 and the server host node(0) 109, 111 installed in the example physical rack 102 of FIG. 1. In the illustrated example of FIG. 1 both of the HMSs 108, 114 are provided in corresponding management switches 107, 113 and the corresponding server host nodes(0) 109, 111 as a redundancy feature in which one of the HMSs 108, 114 is a primary HMS, while the other one of the HMSs 108, 114 is a secondary HMS. In this manner, one of the HMSs 108, 114 can take over as a primary HMS in the event of a failure of a management switch 107, 113 and/or a failure of the server host nodes(0) 109, 111 on which the other HMS 108, 114 executes.

In some examples, to help achieve or facilitate seamless failover, two instances of an HMS 108, 114 run in a single physical rack 102, 104. In such examples, the physical rack 102, 104 is provided with two management switches, and each of the two management switches runs a separate instance of the HMS 108, 114. In such examples, the physical rack 102 of FIG. 1 runs two instances of the HMS 108 on two separate physical hardware management switches and two separate server host nodes(0), and the physical rack 104 of FIG. 1 runs two instances of the HMS 114 on two separate physical hardware management switches and two separate server host nodes(0). For example, one of the instances of the HMS 108 on the physical rack 102 serves as the primary HMS 108 and the other instance of the HMS 108 serves as the secondary HMS 108. The two instances of the HMS 108 on two separate management switches and two separate server host nodes(0) in the physical rack 102 (or the two instances of the HMS 114 on two separate management switches and two separate server host nodes(0) in the physical rack 104) are connected over a point-to-point, dedicated Ethernet link which carries heartbeats and memory state synchronization between the primary and secondary HMS instances.

The example virtualization layer 204 of the illustrated example includes the SDDC manager 125, 127. The example SDDC manager 125, 127 communicates with the HMS 108, 114 to manage the physical hardware resources 124, 126. The example SDDC manager 125, 127 creates the example virtual server rack 106 out of underlying physical hardware resources 124, 126 that may span one or more physical racks (or smaller units such as a hyper-appliance or half rack) and handles physical management of those resources. The example SDDC manager 125, 127 uses the virtual server rack 106 as a basis of aggregation to create and provide operational views, handle fault domains, and scale to accommodate workload profiles. The example SDDC manager 125, 127 keeps track of available capacity in the virtual server rack 106, maintains a view of a logical pool of virtual resources throughout the SDDC life-cycle, and translates logical resource provisioning to allocation of physical hardware resources 124, 126.

In the illustrated example, the SDDC manager 125, 127 includes an example packet flow improver 208 to more efficiently execute packet flows using available networking resources. For example, the packet flow improver 208 can generate a list of ESGs in a virtualized network. In such an example, the packet flow improver 208 can obtain a status of a virtualized network resource such as a distributed logical router (DLR), an ESG, etc. For example, the packet flow improver 208 can obtain monitoring information such as a processor utilization (e.g., CPU utilization, an amount of CPU resources available to execute one or more tasks, etc.), routing utilization, switching utilization, etc., of the virtualized network resource. In some examples, monitoring information such as routing and switching utilization correspond to network availability (e.g., a load switch utilization, an amount of available network bandwidth to execute one or more packet flows, etc.), etc., of the virtualized network resource.

In some examples, the packet flow improver 208 can generate (e.g., iteratively generate, etc.) an ESG load balance list to distribute new and/or existing packet flows in a virtualized network. For example, the packet flow improver 208 can generate a new ESG load balance list, update an existing ESG load balance list, etc., based on a time interval (e.g., every processing cycle, every 100 milliseconds, every 2 seconds, etc.) and/or upon command or request (e.g., by request of a user, the hypervisor 210, etc.). For example, the packet flow improver 208 can generate an ESG load balance list including one or more ESGs to satisfy a load balance list threshold (e.g., an ESG load balance list threshold, etc.). For example, the packet flow improver 208 can generate an ESG load balance list that includes four ESGs out of eight total ESGs operating in a virtualized network to satisfy an ESG load balance list threshold. In such an example, the ESG load balance list threshold is at least half of the total number of ESGs in the virtualized network (e.g., 4 ESGs=8 total ESGs operating in the virtualized network×0.5, etc.). Alternatively, the example packet flow improver 208 can use any other number of ESGs to satisfy the ESG load balance list threshold.

In some examples, the packet flow improver 208 generates a network routing configuration (e.g., a forwarding table configuration, a routing table configuration, a switching table configuration, etc.) based on the generated ESG load balance list. For example, the network routing configuration can include one or more IP addresses, ports, and/or MAC addresses. In some examples, the packet flow improver 208 adjusts a policy of one or more network resources based on the generated network table configuration. For example, the packet flow improver 208 can direct the HMS 108, 114 to adjust a policy (e.g., an ECMP routing hash policy, a Quality-of-Service (QoS policy), etc.) of one or more of the ToR switches 110, 112, 116, 118. For example, the packet flow improver 208 can direct the HMS 108, 114 to update a routing table (e.g., add one or more ESGs, remove one or more ESGs, etc.) included in an ECMP routing hash policy of the ToR Switch A 110 of the first physical rack 102. In response to the packet flow improver 208 adjusting the policy of the one or more network resources, a new or existing packet flow can be redistributed among the one or more network resources to optimize packet flow among virtualized servers.

The example SDDC manager 125, 127 interfaces with an example hypervisor 210 of the virtualization layer 204. The example hypervisor 210 is installed and runs on server hosts in the example physical resources 124, 126 to enable the server hosts to be partitioned into multiple logical servers to create VMs. In some examples, the hypervisor 210 may be implemented using a VMWARE ESXI™ hypervisor available as a component of a VMWARE VSPHERE® virtualization suite developed and provided by VMware, Inc. The VMWARE VSPHERE® virtualization suite is a collection of components to setup and manage a virtual infrastructure of servers, networks, and other resources.

In the illustrated example of FIG. 2, the hypervisor 210 is shown having a number of virtualization components executing thereon including an example network virtualizer 212, an example VM migrator 216, an example distributed resource scheduler (DRS) 216, and an example storage virtualizer 218. In the illustrated example, the SDDC manager 125, 127 communicates with these components to manage and present the logical view of underlying resources such as hosts and clusters. The example SDDC manager 125, 127 also uses the logical view for orchestration and provisioning of workloads.

The example network virtualizer 212 abstracts or virtualizes network resources such as physical hardware switches (e.g., the management switches 107, 113 of FIG. 1, the ToR switches 110, 112, 116, 118, and/or the spine switches 122, etc.) to provide software-based virtualized networks. The example network virtualizer 212 enables treating physical network resources (e.g., routers, switches, etc.) as a pool of transport capacity. In some examples, the network virtualizer 212 also provides network and security services to VMs with a policy driven approach. The example network virtualizer 212 includes a number of components to deploy and manage virtualized network resources across servers, switches, and clients. For example, the network virtualizer 212 includes a network virtualization manager that functions as a centralized management component of the network virtualizer 212 and runs as a virtual appliance on a server host.

In some examples, the network virtualizer 212 can be implemented using a VMWARE NSX™ network virtualization platform that includes a number of components including a VMWARE NSX™ network virtualization manager. For example, the network virtualizer 212 can include a VMware® NSX Manager™. The NSX Manager can be the centralized network management component of NSX, and is installed as a virtual appliance on any ESX™ host (e.g., the hypervisor 210, etc.) in a vCenter Server environment to provide an aggregated system view for a user. For example, an NSX Manager can map to a single vCenterServer environment and one or more NSX Edge, vShield Endpoint, and NSX Data Security instances. For example, the network virtualizer 212 can generate virtualized network resources such as a logical distributed router (LDR) and/or an edge services gateway (ESG).

The example VM migrator 214 is provided to move or migrate VMs between different hosts without losing state during such migrations. For example, the VM migrator 214 allows moving an entire running VM from one physical server to another with substantially little or no downtime. The migrating VM retains its network identity and connections, which results in a substantially seamless migration process. The example VM migrator 214 enables transferring the VM's active memory and precise execution state over a high-speed network, which allows the VM to switch from running on a source server host to running on a destination server host.

The example DRS 216 is provided to monitor resource utilization across resource pools, to manage resource allocations to different VMs, to deploy additional storage capacity to VM clusters with substantially little or no service disruptions, and to work with the VM migrator 214 to automatically migrate VMs during maintenance with substantially little or no service disruptions.

The example storage virtualizer 218 is software-defined storage for use in connection with virtualized environments. The example storage virtualizer 218 clusters server-attached hard disk drives (HDDs) and solid-state drives (SSDs) to create a shared datastore for use as virtual storage resources in virtual environments. In some examples, the storage virtualizer 218 may be implemented using a VMWARE VIRTUAL SAN™ network data storage virtualization component developed and provided by VMware, Inc.

The virtualization layer 204 of the illustrated example, and its associated components are configured to run VMs. However, in other examples, the virtualization layer 204 may additionally and/or alternatively be configured to run containers. For example, the virtualization layer 204 may be used to deploy a VM as a data computer node with its own guest OS on a host using resources of the host. Additionally and/or alternatively, the virtualization layer 204 may be used to deploy a container as a data computer node that runs on top of a host OS without the need for a hypervisor or separate OS.

In the illustrated example, the OAM layer 206 is an extension of a VMWARE VCLOUD® AUTOMATION CENTER™ (VCAC) that relies on the VCAC functionality and also leverages utilities such as VMWARE VCENTER™ LOG INSIGHT™, and VMWARE VCENTER™ HYPERIC® to deliver a single point of SDDC operations and management. The example OAM layer 206 is configured to provide different services such as health monitoring service, capacity planner service, maintenance planner service, events and operational view service, and virtual rack application workloads manager service.

Example components of FIG. 2 may be implemented using products developed and provided by VMware, Inc. Alternatively, some or all of such components may alternatively be supplied by components with the same and/or similar features developed and/or provided by other virtualization component developers.

Figure 3:
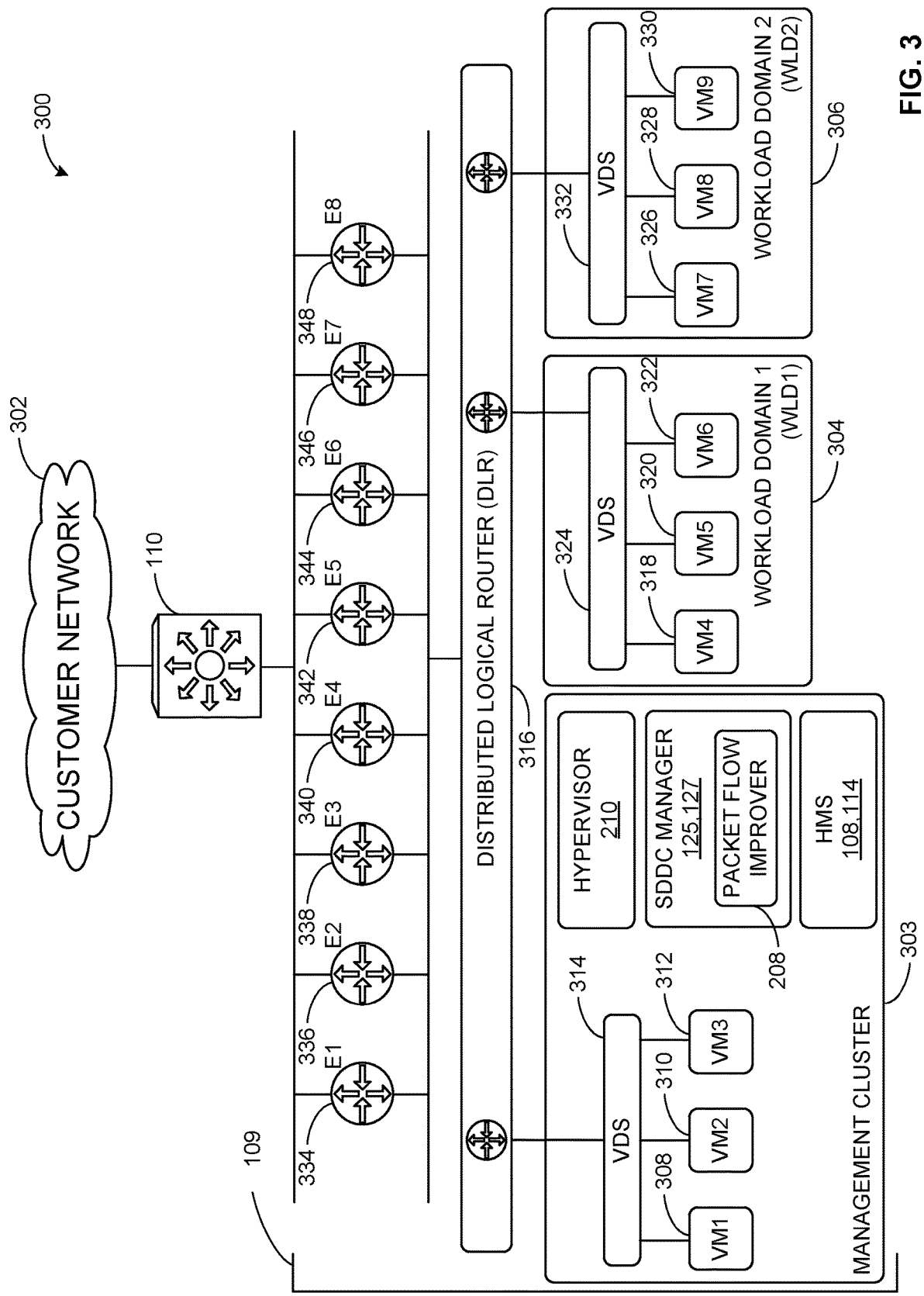
FIG. 3 illustrates an example network overlay of the example virtual server rack of FIG. 1.

FIG. 3 illustrates an example network overlay 300 of the example virtual server rack 106 of FIG. 1. In the illustrated example, a user can execute an application to initiate communication between a customer network 302 and the server host node(0) 109 of FIG. 1. While the functions of the example server host node(0) 109 described below are described in connection with the server host node(0) 109, the described functionality also applies to the example server host node(0) 111 of FIG. 1. In the illustrated example, the server host node(0) 109 includes a management cluster 303, a first workload domain (WLD1) 304, and a second workload domain (WLD2) 306. In the illustrated example, the management cluster 303 the WLD1 304, and the WLD2 306 are connected to a customer network 302 via the ToR Switch A 110 of the first physical rack 102 of FIG. 1. Alternatively, any other ToR switch of the first physical rack 102 can be utilized. In the illustrated example, the first and the second workload domains 304, 306 are virtual hardware policies or subsets of virtual resources mapped to physical hardware resources to execute a user application. For example, the first workload domain 304 can include one or more computing resources (e.g., CPUs, graphical processing units (GPUs), etc.), one or more storage resources (e.g., HDDs, SSDs, etc.), one or more networking resources (e.g., a virtual distributed switch (VDS), a DLR, etc.), etc.

In the illustrated example, the management cluster 303 is a dedicated group of hosts reserved for running VMs that provide management services to infrastructure environments. In the illustrated example, the management cluster 303 includes a first through a third VM 308, 310, 312 to provide management services to the first and the second workload domains 304, 306. The management cluster 303 of the illustrated example further includes the SDDC manager 125, 127 of FIGS. 1-2 including the packet flow improver 208 of FIG. 2, the HMS 108, 114 of FIGS. 1-2, and the hypervisor 210 of FIG. 2.

In the illustrated example, the first through the third VMs 308, 310, 312 are connected to the customer network 302, the WLD1 304, and/or the WLD2 306 via a first virtual distributed switch (VDS) 314. In the illustrated example, the first VDS 314 directs virtualized network traffic by transmitting VM traffic to the physical network and to other VMs. For example, the first VDS 314 can forward Layer 2 (L2) frames, segment VM traffic into virtual local area networks (VLANs), can conduct port mirroring, etc. In some examples, the first VDS 314 can be implemented using a VMware vSphere® Distributed Switch™ available as a component of a VMWARE VSPHERE® virtualization suite developed and provided by VMware, Inc.

In the illustrated example, the first VDS 314 directs packet flows to each of the first through the third VMs 308, 310, 312 obtained from a distributed logical router (DLR) 316. In the illustrated example, the DLR 316 provides East-West distributed routing with tenant IP addresses and data path isolation. For example, a VM that resides on the same host but on different subnets can communicate with one another without having to traverse a traditional routing interface. For example, the first VM 308 can communicate with a fourth through a sixth VM 318, 320, 322 via a second VDS 324. In another example, the first VM 308 can communicate with a seventh through a ninth VM 326, 328, 330 via a third VDS 332.

In the illustrated example, the DLR 316 facilitates communication between the customer network 302 and the server host node(0) 109. For example, the DLR 316 can facilitate communication via address resolution protocol (ARP). For example, for a packet flow between the customer network 302 and the first VM 308, the DLR 316 can obtain a hardware address (e.g., a media access control (MAC) address, etc.) of the first VM 308. In response to obtaining the hardware address, the DLR 316 can generate a packet header (e.g., an L2 packet header, etc.) for packets in the data flow between the customer network 302 and the first VM 308.

In the illustrated example, communication between the customer network 302 and the server host node(0) 109 is facilitated by the ToR Switch A 110 of the first physical rack 102 of FIG. 1 and a first through an eighth ESG switch 334, 336, 338, 340, 342, 344, 346, 348 (denoted by E1-E8). In operation, the first through the eighth example ESG switches E1-E8 334, 336, 338, 340, 342, 344, 346, 348 of the illustrated example are included in the example management cluster 303. For clarity purposes, the first through the eighth example ESG switches E1-E8 334, 336, 338, 340, 342, 344, 346, 348 of the illustrated example are depicted as external to the example management cluster 303.

In the illustrated example, the ESG switches 334, 336, 338, 340, 342, 344, 346, 348 connect the server host node(0) 109 to the customer network 302 by providing common gateway services such as dynamic host configuration protocol (DHCP), virtual private network (VPN), network address translation (NAT), dynamic routing, load balancing, etc., and/or a combination thereof. For example, the first ESG switch 334 can perform NAT by controlling source and destination IP addresses and conduct port translation in a virtualized network. In another example or the same example, the first ESG switch 334 can perform load balancing by dynamically configuring virtual IP addresses and server groups based on a routing policy. For example, the routing policy can include an ECMP routing hash policy based on an ESG routing table including one or more ESGs.

Figure 4:
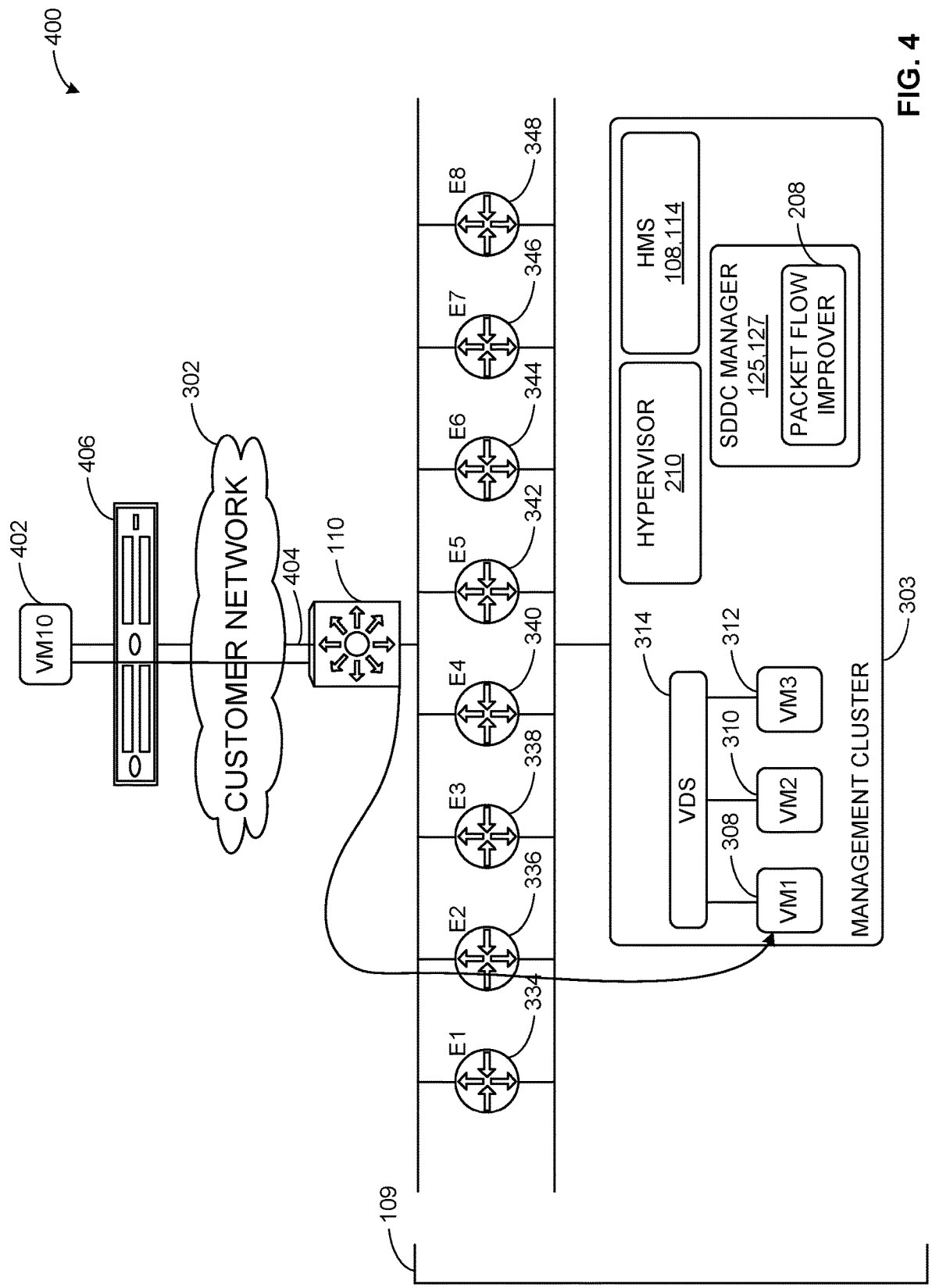
FIG. 4 illustrates an example packet flow in the example network overlay of FIG. 3.

FIG. 4 illustrates an example packet flow 400 in a simplified version of the example network overlay 300 of FIG. 3. In the illustrated example, the packet flow 400 is a North-South flow between a source host (e.g., a source host node) including a tenth VM 402 and a destination host (e.g., a destination host node) including the first VM 308 of FIG. 3. In the illustrated example, a communication link 404 between the ToR Switch A 110 of the first physical rack 102 of FIG. 1 and the tenth VM 402 via the customer network 302 is Layer 2 (L2) or L2 fabric. L2 refers to a data link layer where data packets are encoded and decoded into actual bits. Transmitting data packets via L2 includes using Address Resolution Protocol (ARP), which includes analyzing a source and a destination MAC address included in a header of each of the transmitted data packets.

In some examples, transmitting a data packet using L2 includes transmitting a data packet from a source MAC address to a destination MAC address. In such examples or other examples, L2 data links cannot implement ECMP because the destination MAC address of every data packet will be a MAC address of a single destination. For example, each of the data packets in the packet flow 400 can include a source MAC address of a routing resource in a customer server host node 406 and a destination MAC address of a single one of the ESGs 334, 336, 338, 340, 342, 344, 346, 348.

In the illustrated example, the customer server host node 406 implements L2. In the illustrated example, the customer server host node 406 selects the second ESG 336 as a next hop (e.g., a next possible routing destination for a data packet) and sends an entirety of the packet flow 400 to the second ESG 336 based on implementing L2. In some examples, the North-South bandwidth can be diminished based on implementing L2. For example, each one of the first through the eighth ESGs 334, 336, 338, 340, 342, 344, 346, 348 can route data traffic at a rate of 10 Gbps. In such an example, if a customer requires 80 Gbps of North-South bandwidth, the customer will have to deploy eight ESGs to generate the 80 Gbps of North-South bandwidth. However, as depicted in the illustrated example, the customer server host node 406 is sending the entirety of the data flow 400 to the second ESG 336 and, thus, limits the North-South bandwidth to 10 Gbps instead of the required 80 Gbps.

Figure 5:
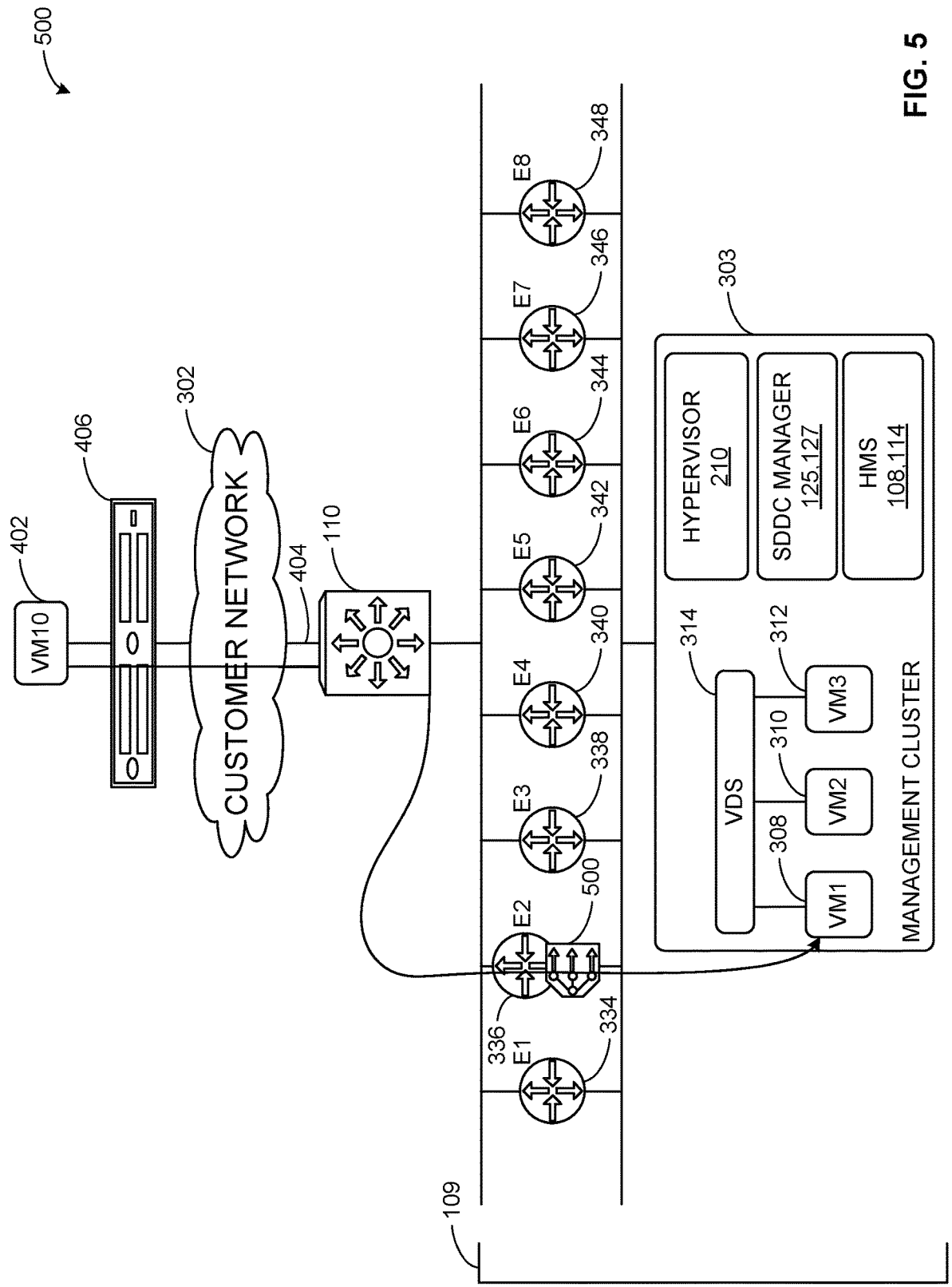
FIG. 5 illustrates the example packet flow of FIG. 4 in response to implementing an example load balancing operation in the example network overlay of FIGS. 3-4.

FIG. 5 illustrates the example packet flow of FIG. 4 in response to implementing a load balancing operation in the example known network overlay of FIGS. 3-4. In the illustrated example, the customer server host node 406 of FIG. 4 is transmitting an entirety of the packet flow 400 to the second ESG 336 of FIGS. 3-4 based on the customer server host node 406 implementing L2. In response to a North-South bandwidth of the example communication link 404 of FIG. 4 being limited, the example network virtualizer 212 of FIGS. 2-4 executes a load balancing operation 500.

However, the load balancing operation 500 of the illustrated example fails because the network virtualizer 212 cannot change a routing policy of the customer server host node 406 to implement ECMP using L3 or L3 fabric. For example, if the customer server host node 406 can implement ECMP using L3, the customer server host node 406 can distribute the packet flow 400 among the ESGs 334, 336, 338, 340, 342, 344, 346, 348 based on an ECMP routing hash policy. For example, L3 refers to a network layer where data packets are routed and forwarded between intermediate routers that can support ECMP implementation. In the illustrated example, the load balancing operation 500 attempts to redistribute the packet flow 400 among the ESGs 334, 336, 338, 340, 342, 344, 346, 348. However, the example packet flow 400 has already reached the second example ESG 336 and cannot be redirected in an East-West direction (e.g., between the ESGs 334, 336, 338, 340, 342, 344, 346, 348).

Figure 6:
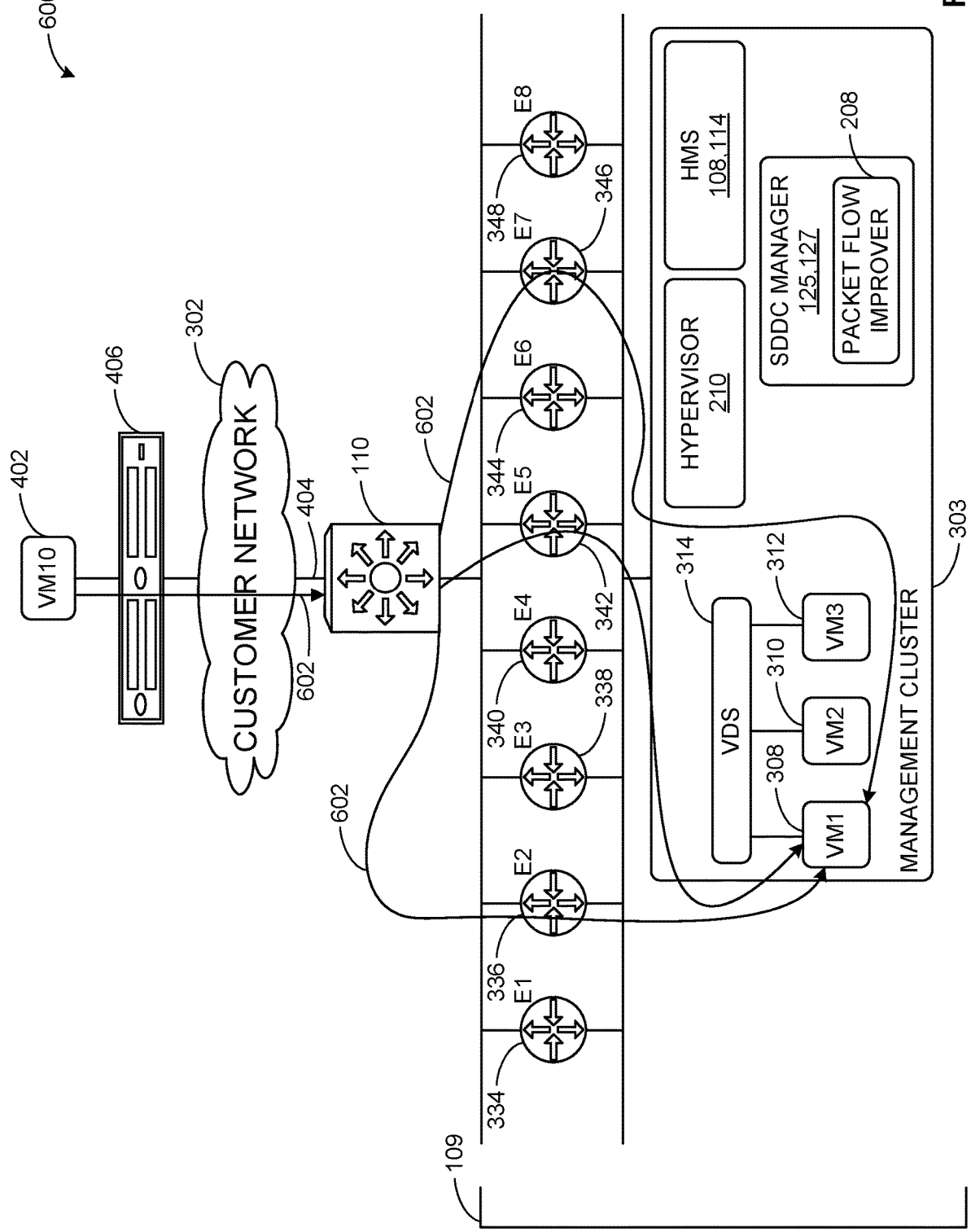
FIG. 6 illustrates an example packet flow improver implementing examples disclosed herein in the example network overlay of FIGS. 3-5.

FIG. 6 illustrates the example packet flow improver 208 of FIGS. 2-5 operating in an example network overlay 600 to optimize a packet flow 602 between the destination host including the first VM 308 of FIGS. 3-5 and the source host including the tenth VM 402 of FIGS. 4-5. In the illustrated example, the customer server host node 406 implements L2. As a result, each of the data packets in the packet flow 602 includes a destination MAC address for a single one of the ESGs 334, 336, 338, 340, 342, 344, 346, 348. For example, the customer server host node 406 directs an entirety of the data packets in the packet flow 602 to a single one of the ESGs 334, 336, 338, 340, 342, 344, 346, 348.

In the illustrated example, the SDDC manager 125, 127 of the management cluster 303 includes the packet flow improver 208 to redistribute the packet flow 602. For example, the customer server host node 406 can include the destination MAC address of each of the data packets in the packet flow 602 to be a MAC address of the third ESG 338. In such an example, the packet flow improver 208 directs an update to a policy (e.g., an ECMP routing hash policy, a QoS policy, etc.) of the ToR Switch A 110 of the first physical rack 102 of FIG. 1. For example, the packet flow improver 208 can direct the ToR Switch A 110 to adjust a routing table used by an ECMP routing hash policy of the ToR Switch A 110 based on an ESG load balance list. In some examples, the ESG load balance list includes one or more of the ESGs 334, 336, 338, 340, 342, 344, 346, 348 available to switch packets to execute the packet flow 602.

In some examples, the packet flow improver 208 generates an ESG load balance list including one or more abstracted network resources corresponding to one or more physical hardware resources. For example, as illustrated in FIG. 6, the ESG load balance list includes the second, fifth, and seventh ESGs 336, 342, 346. In such an example, the second, fifth, and seventh ESGs 336, 342, 346 can correspond to one or more of the physical hardware resources 124, 126 of FIG. 1 such as the ToR Switch A 110 of the first physical rack 102, the management switch 107 of the first physical rack, one of the spine switches 122, etc.

In prior solutions, the packet flow 602 of the illustrated example would be limited by a North-South bandwidth of the communication link 404 of 10 Gbps, regardless of how many ESGs are operating in the example network 600 of FIG. 6. For example, the customer server host node 406 can direct the entirety of the packet flow 602 to the MAC address of the first ESG 334, where the first ESG 334 can route data traffic at a rate of 10 Gbps. In the illustrated example of FIG. 6, the North-South bandwidth of the communication link 404 of the packet flow 602 increases by a factor of three to 30 Gbps based on each one of the second, fifth, and seventh ESGs 336, 342, 346 routing data traffic at a rate of 10 Gbps (e.g., 30 Gbps=10 Gbps/ESG×3 ESGs). Compared to the prior solutions, the packet flow improver 208 can improve the North-South bandwidth of the communication link 404 by spreading a transmission of the packet flow 602 across more than one ESG in the network 600.

Figure 7:
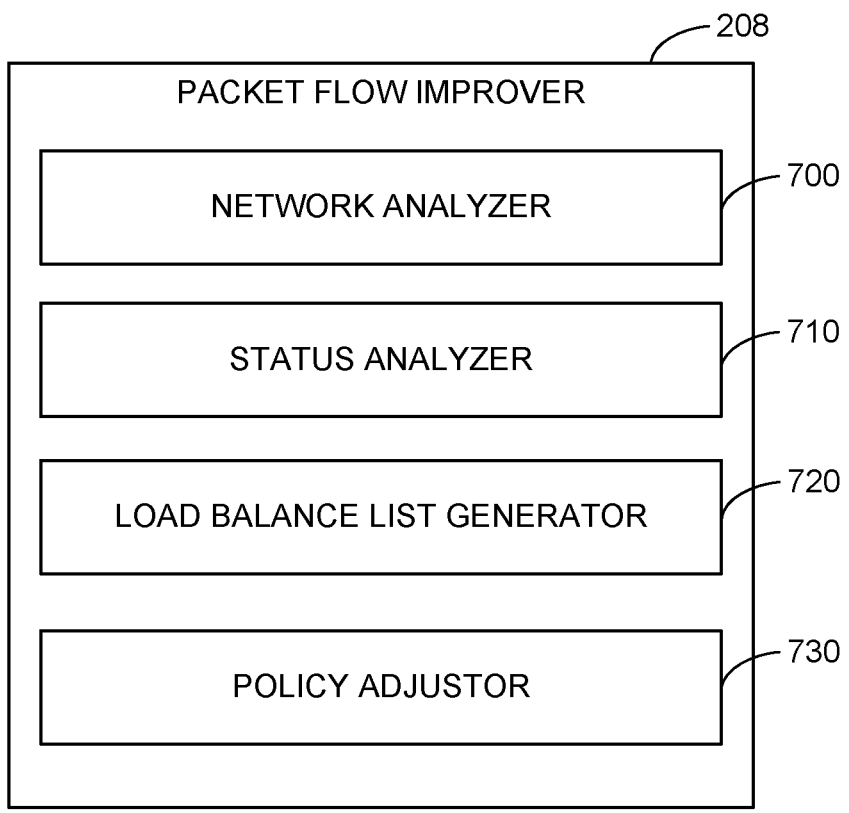
FIG. 7 is a block diagram of an example implementation of the example packet flow improver of FIG. 6.

FIG. 7 is a block diagram of an example implementation of the example packet flow improver 208 of FIGS. 2-3 and 6. The example packet flow improver 208 optimizes a packet flow among virtualized servers based on generating (e.g., iteratively generating) an ESG load balance list. In the illustrated example, the packet flow improver 208 includes an example network analyzer 700, an example status analyzer 710, an example load balance list generator 720, and an example policy adjustor 730.

In the illustrated example, the packet flow improver 208 incudes the network analyzer 700 to obtain information (e.g., network activity, monitoring information, network configuration information, etc.) from one or more virtual resources corresponding to one or more physical hardware resources. For example, the network analyzer 700 can determine that one of the physical hardware resources 124, 126 (e.g., the ToR Switch A 110 of the first physical rack 102, etc.) received a data packet. In another example, the network analyzer 700 can determine that more than two ESGs have been generated in a communication network. For example, the network analyzer 700 can determine that the network virtualizer 212 generated the first through the eighth ESGs E1-E8 334, 336, 338, 340, 342, 344, 346, 348 in the communication network 300 of FIG. 3. In another example or the same example, the network analyzer 700 can obtain monitoring information including ESG monitoring information from the network virtualizer 212 of FIGS. 2-6 corresponding to the ToR Switch A 110 of the first physical rack 102 of FIG. 1. In another example, the network analyzer 700 can obtain network configuration information including a number and/or a type of network resources in a virtualized network. For example, the network analyzer 700 can generate a list of abstracted network resources (e.g., the first through the eighth ESGs E1-E8 334, 336, 338, 340, 342, 344, 346, 348) based on the obtained network configuration information.

In some examples, the network analyzer 700 generates a list of ESGs in a virtualized network based on network configuration information obtained from the network virtualizer 212. For example, the network analyzer 700 can generate a list of ESGs that include the first through the eighth ESGs E1-E8 334, 336, 338, 340, 342, 344, 346, 348 based on obtained network configuration information from the network virtualizer 212. In some examples, the network analyzer 700 obtains ESG monitoring information from the network virtualizer 212. For example, the network analyzer 700 can obtain status parameters (e.g., utilization status parameters, etc.) such as processor status parameters (e.g., CPU utilization, computing power availability, etc.), network availability parameters (e.g., switch load utilization), etc. In some examples, the network analyzer 700 determines whether to continue monitoring the network. For example, the network analyzer 700 can determine to continue monitoring the network when packet flows are being executed in the network.

In the illustrated example of FIG. 7, the packet flow improver 208 includes the status analyzer 710 to determine values of status parameters (e.g., a processor utilization parameter, a routing utilization parameter, a switching utilization parameter, etc.) of virtual resources based on obtained monitoring information. In some examples, the status analyzer 710 determines how many ESGs are in a network overlay based on the obtained monitoring information. For example, the status analyzer 710 can determine that the first through the eighth ESGs E1-E8 334, 336, 338, 340, 342, 344, 346, 348 are operating in the network overlay 600 of FIG. 6 based on obtained ESG monitoring information from the network virtualizer 212.

In some examples, the status analyzer 710 determines whether an ESG can be used for executing a packet flow based on the obtained monitoring information. For example, the status analyzer 710 can identify the first ESG E1 334 is available to execute a packet flow based on determining a CPU utilization and/or a switch load utilization of the first ESG E1 334. In such an example, the status analyzer 710 can identify the first ESG E1 334 for execution of a packet flow based on determining a CPU utilization of 15% and a switch load percentage of 25%. In such an example, the first ESG E1 334 is using 15% of available computing power and is using 25% of available packet switching capability. In some examples, the status analyzer 710 sorts identified ESGs in the network based on an alphanumerical designator of the ESG, a value of a status parameter of the ESG, etc.

In the illustrated example of FIG. 7, the packet flow improver 208 includes the load balance list generator 720 to generate a list of ESGs to execute packet flows (e.g., existing packet flows, new packets flows, etc., and/or a combination thereof). In some examples, the load balance list generator 720 generates an ESG load balance list based on adding a number of ESGs to satisfy an ESG load balance list threshold. For example, the load balance list generator 720 can add one or more ESGs to an ESG load balance list, compare a number of ESGs in the ESG load balance list to the ESG load balance list threshold, and stop adding ESGs to the ESG load balance list when the ESG load balance list threshold has been satisfied based on the comparison. In another example, the load balance list generator 720 can sort ESGs in a virtualized network in a list based on ESG monitoring information, add one or more ESGs from the sorted list to an ESG load balance list (e.g., add ESGs with the lowest CPU utilization and/or the lowest switch load utilization first, etc.), compare a number of ESGs in the ESG load balance list to the ESG load balance list threshold, and stop adding ESGs to the ESG load balance list when the ESG load balance list threshold has been satisfied based on the comparison.

For example, the load balance list generator 720 can satisfy an ESG load balance list threshold of four ESGs or more by generating a list that includes the first through the fourth ESGs E1-E4 of the network overlay 600 of FIG. 6. In some examples, the load balance list generator 720 selects an ESG to process. For example, the load balance list generator 720 can select an ESG to process based on alphanumerical order of an ESG designator (e.g., a list of ESGs sorted E1, E2, E3, etc.), a CPU utilization (e.g., from lowest to highest CPU utilization), a switch load utilization (e.g., from lowest to highest switch load utilization), etc. Alternatively, the example load balance list generator 720 can randomly select an ESG to process.

In some examples, the load balance list generator 720 can add an ESG to the load balance list based on comparing a value of a utilization status parameter of the ESG to a utilization status threshold (e.g., an ESG utilization threshold, a CPU utilization threshold, a switch load utilization threshold, etc.), determining whether the value satisfies the utilization status threshold, and adding the ESG to the load balance list based on the comparison. For example, the load balance list generator 720 can add the fifth ESG E5 342 of the network overlay 600 of FIG. 6 based on the fifth ESG E5 342 having a CPU utilization less than a CPU utilization threshold of 30%. In another example, the load balance list generator 720 can add the fifth ESG E5 342 of the network overlay 600 of FIG. 6 based on the fifth ESG E5 342 having a switch load utilization less than a switch load utilization threshold of 30%. Alternatively, any other CPU utilization threshold or switch load utilization may be used.

In some examples, the load balance list generator 720 can add an ESG to an ESG load balance list based on each status parameter of the ESG satisfying a corresponding threshold. Alternatively, the example load balance list generator 720 can add an ESG to an ESG load balance list based on one or more status parameters of the ESG satisfying one or more corresponding thresholds. In some examples, the load balance list generator 720 adds an ESG to an ESG load balance list when a value of a status parameter of the ESG does not satisfy a threshold. For example, if a number of ESGs in the ESG load balance list does not satisfy a threshold, the load balance list generator 720 can add a next-best candidate. For example, the load balance list generator 720 can add an ESG not currently in the ESG load balance list that has the lowest CPU utilization, the lowest switch load utilization, etc., out of the ESGs that are not currently in the ESG load balance list.

In the illustrated example, the packet flow improver 208 includes the policy adjustor 730 to adjust a policy of one or more network resources based on a generated network routing configuration. In some examples, the policy adjustor 730 generates a routing table configuration based on an ESG load balance list generated by the policy adjustor 730. For example, the policy adjustor 730 can generate a routing table configuration including an IP address, a port number, a MAC address, etc., and/or a combination thereof corresponding to the ESGs in the ESG load balance list. In some examples, the policy adjustor 730 adjusts the policy of a network resource by directing the HMS 108, 114 of FIGS. 1-2 to configure one or more physical resources 124, 126 of FIGS. 1-2. For example, the policy adjustor 730 can direct the HMS 108, 114 to adjust a policy of the ToR Switch A 110 of the first physical rack 102 of FIG. 1. In such an example, the policy adjustor 730 can direct the HMS 108, 114 to adjust a routing table used by an ECMP routing hash policy of the ToR Switch A 110. For example, the policy adjustor 730 can direct the HMS 108, 114 to update a routing table by adding one or more ESGs, removing one or more ESGs, etc., used by an ECMP routing hash policy to direct, redistribute, route, etc., packet flow among the ESGs in a communication network.

The packet flow improver 208 of the illustrated example can improve packet flows in a communication network using an L2 network fabric by enabling ECMP in a network resource such as a leaf switch (e.g., the ToR Switch A 102 of the physical rack 102, etc.) without additional specialized hardware. By using the existing physical hardware resources 124, 126 to deploy ECMP on uplinks in the communication network, operations within a customer network can remain unchanged as processing the packet flows from the customer network can be improved at the physical hardware resources 124, 126. For example, a customer can direct a packet flow from the customer network 302 of FIG. 3 to the first VM1 308 of FIG. 3, where an entirety of the packet flow is directed to the first ESG E1 334 based on the customer network 302 and/or the network 300 of FIG. 3 using L2 network fabric.

For example, the packet flow improver 208 can direct the ToR Switch A 110 of the first physical rack 102 to intercept the North-South packet flow from the customer network 302 and distribute the North-South packet flow among more than one ESG. For example, the example network analyzer 700 can obtain monitoring information from the ESGs E1-E8 334, 336, 338, 340, 342, 344, 346, 348 of FIG. 3. In such an example, the status analyzer 710 can determine values of status parameters and/or sort the ESGs E1-E8 334, 336, 338, 340, 342, 344, 346, 348 based on the status parameters. The example load balance list generator 720 can generate a list of the third, sixth, and seventh ESG E3, E6, E7 338, 344, 346 based on the ESGs E3, E6, E7 338, 344, 346 satisfying an ESG status threshold. The example policy adjustor 730 can generate a routing table configuration and direct the example HMS 108, 114 of FIGS. 1-6 to adjust a policy of the ToR Switch A 110 of the first physical rack 102. For example, the policy adjustor 730 can direct the HMS 108, 114 to adjust an ECMP routing hash policy of the ToR Switch A 110. By adjusting the policy of the ToR Switch A 110, the example policy adjustor 730 and/or, more generally, the example packet flow improver 208 can increase the North-South bandwidth of packet flows between the customer network 302 and the VMs 308, 310, 312, 318, 320, 322, 326, 328, 330 of FIG. 3.

While an example manner of implementing the packet flow improver 208 of FIGS. 2 and 6 is illustrated in FIG. 7, one or more of the elements, processes, and/or devices illustrated in FIG. 7 may be combined, divided, re-arranged, omitted, eliminated, and/or implemented in any other way. Further, the example network analyzer 700, the example status analyzer 710, the example load balance list generator 720, the example policy adjustor 730 and/or, more generally, the example packet flow improver 208 of FIGS. 2 and 6 may be implemented by hardware, software, firmware and/or any combination of hardware, software and/or firmware. Thus, for example, any of the example network analyzer 700, the example status analyzer 710, the example load balance list generator 720, the example policy adjustor 730 and/or, more generally, the example packet flow improver 208 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example network analyzer 700, the example status analyzer 710, the example load balance list generator 720, and/or the example policy adjustor 730 is/are hereby expressly defined to include a non-transitory computer readable storage device or storage disk such as a memory, a digital versatile disk (DVD), a compact disk (CD), a Blu-ray disk, etc. including the software and/or firmware. Further still, the example packet flow improver 208 of FIGS. 2 and 6 may include one or more elements, processes and/or devices in addition to, or instead of, those illustrated in FIG. 7, and/or may include more than one of any or all of the illustrated elements, processes, and devices.

Figure 8:
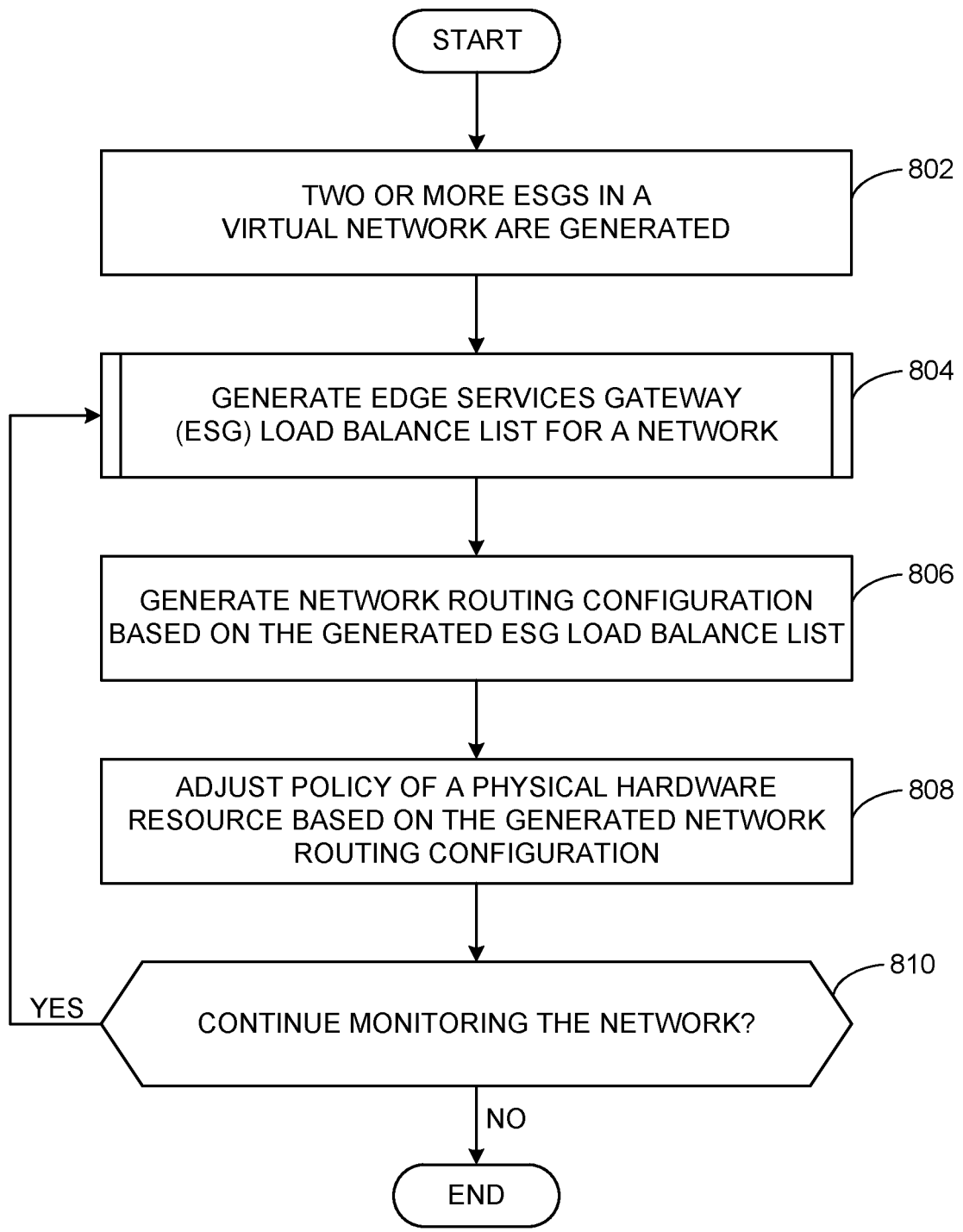
FIG. 8 is a flowchart representative of an example method that can be executed by the example packet flow improver of FIGS. 6-7 to optimize packet flow among virtualized servers.
Figure 9:
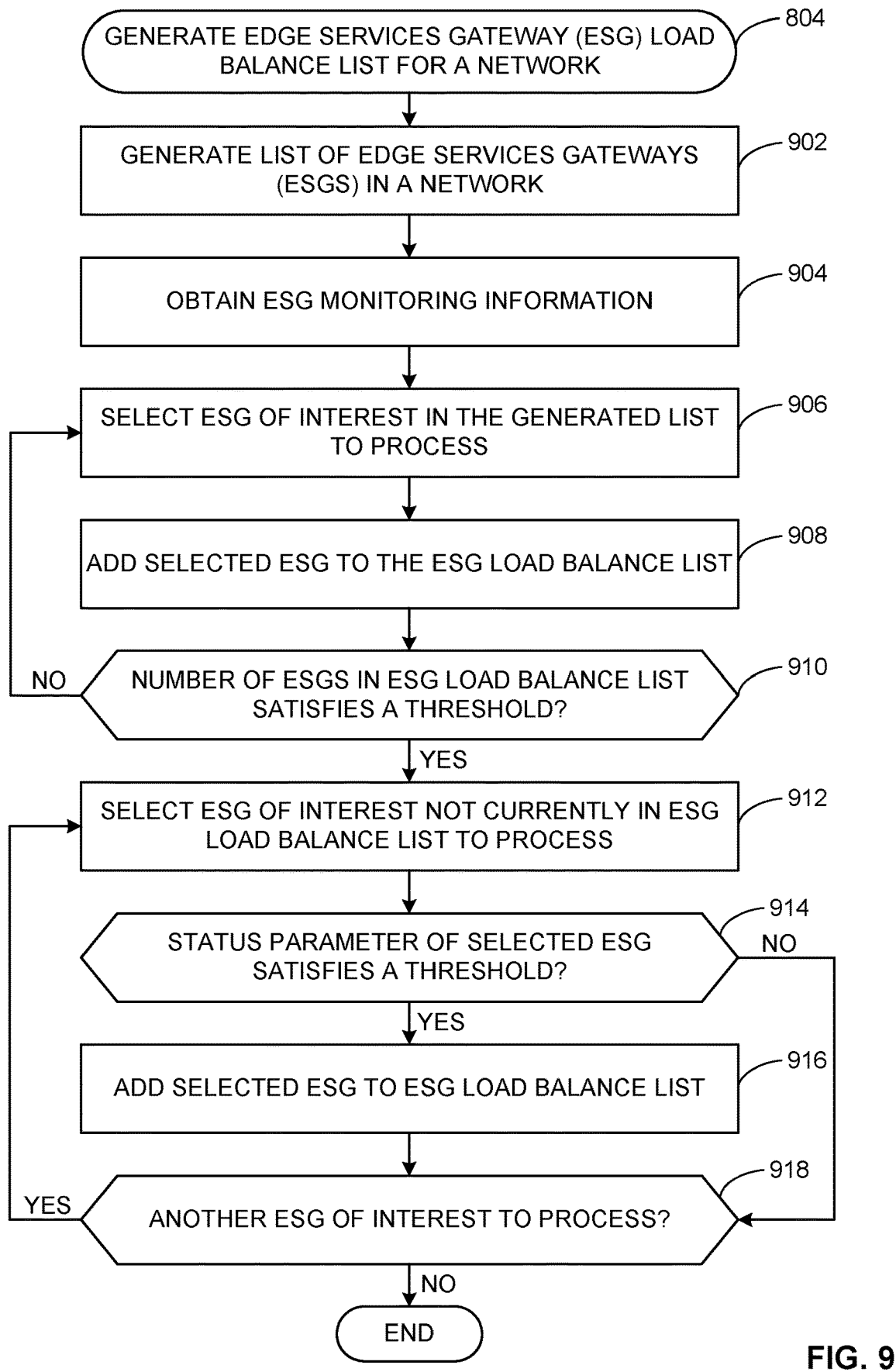
FIG. 9 is a flowchart representative of an example method that can be executed by the example packet flow improver of FIGS. 6-7 to generate a load balance list.
Figure 10:
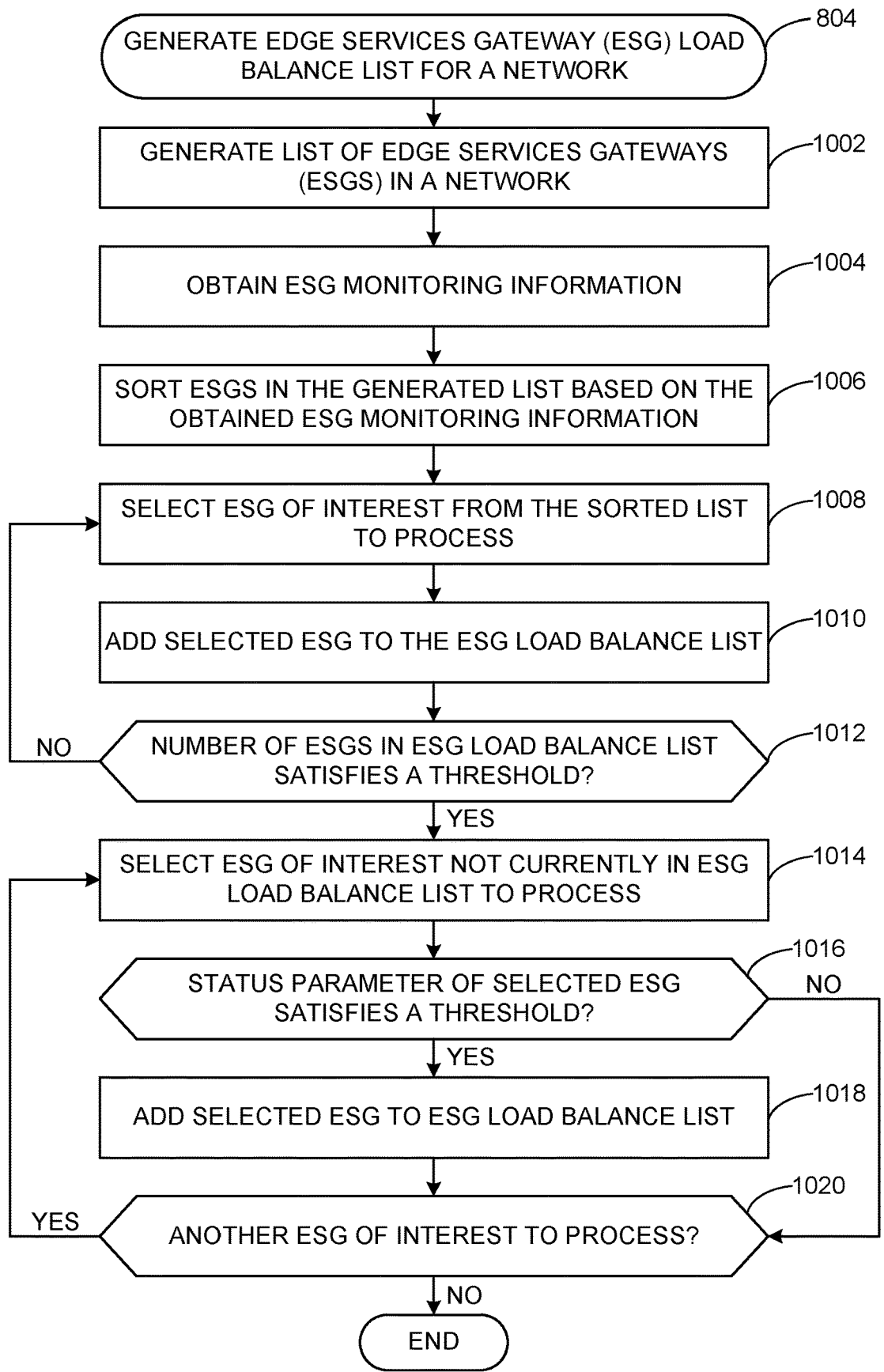
FIG. 10 is a flowchart representative of another example method that can be executed by the example packet flow improver of FIGS. 6-7 to generate a load balance list.

Flowcharts representative of example machine readable instructions for implementing the packet flow improver 208 of FIGS. 2 and 6-7 are shown in FIGS. 8-10. In these examples, the machine readable instructions comprise a program for execution by a processor such as a processor 1212 shown in the example processor platform 1200 discussed below in connection with FIG. 12. The program may be embodied in software stored on a non-transitory computer readable storage medium such as a CD-ROM, a floppy disk, a hard drive, a DVD, a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowcharts illustrated in FIGS. 8-10, many other methods of implementing the example packet flow improver 208 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 8-10 may be implemented using coded instructions (e.g., computer and/or machine readable instructions) stored on a non-transitory computer and/or machine readable medium such as a hard disk drive, a flash memory, a read-only memory, a CD, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open ended in the same manner as the term "comprising" and "including" are open ended.

FIG. 8 is a flowchart representative of an example method that can be performed by the example packet flow improver 208 of FIGS. 2 and 6-7 to improve packet flow among virtualized servers. The example method begins at block 802, at which two or more ESGs in a virtual network are generated. For example, the network analyzer 700 can determine that the network virtualizer 212 generated the first through the eighth ESGs E1-E8 334, 336, 338, 340, 342, 344, 346, 348 in the communication network 300 of FIG. 3.

At block 804, the example packet flow improver 208 generates an edge services gateway (ESG) load balance list for a network. For example, in response to the network analyzer 700 determining that more than two ESGs in the communication network 300 have been generated, the load balance list generator 720 can generate an ESG load balance list including the second, fifth, and seventh ESGs E2, E5, E7 336, 342, 344 of the network overlay 600 of FIG. 6. For example, the ESG load balance list including the second, fifth, and seventh ESGs E2, E5, E7 336, 342, 344 can satisfy an ESG load balance list threshold of three or more ESGs and where each of the ESGs in the ESG load balance list satisfies a CPU utilization threshold, a switch load utilization threshold, etc., and/or a combination thereof. Example process(es) that may be used to implement block 704 is described below in connection with FIGS. 9 and/or 10.

At block 806, the example packet flow improver 208 generates a network routing configuration based on the generated ESG load balance list. For example, the policy adjustor 730 can generate a routing table configuration including an IP address, a port number, a MAC address, etc., for each of the ESGs in the generated ESG load balance list.

At block 808, the example packet flow improver 208 adjusts a policy of a physical hardware resource based on the generated network routing configuration. For example, the policy adjustor 730 can direct the HMS 108, 114 of FIGS. 1-2 to adjust an ECMP routing hash policy of the ToR Switch A 110 of the first physical rack 102 based on the generated routing table configuration.

At block 810, the example packet flow improver 208 determines whether to continue monitoring the network. For example, the network analyzer 700 can determine to continue monitoring the network overlay 600 of FIG. 6 based on packet flows being executed in the network overlay. If, at block 810, the example packet flow improver 208 determines to continue monitoring the network, control returns to block 804 to generate another ESG load balance list for the network, otherwise the example method concludes.

FIG. 9 is a flowchart representative of an example method that can be performed by the example packet flow improver 208 of FIGS. 2 and 6-7 to generate an ESG load balance list for a network. The example process of FIG. 9 may be used to implement the operation of block 804 of FIG. 8. The example method begins at block 902 when the example packet flow improver 208 generates a list of ESGs in a network. For example, the network analyzer 700 can generate a list including the first through the eighth ESGs E1-E8 334, 336, 338, 340, 342, 344, 346, 348 of the network overlay 600 of FIG. 6 based on obtained network configuration information from the network virtualizer 212 of FIGS. 2-6.

At block 904, the example packet flow improver 208 obtains ESG monitoring information. For example, the network analyzer 700 can obtain ESG monitoring information from the network virtualizer 212. In such an example, the status analyzer 710 can determine a CPU utilization, a switch load utilization, etc., and/or a combination thereof for each one of the ESGs in the generated list based on the obtained ESG monitoring information.

At block 906, the example packet flow improver 208 selects an ESG of interest in the generated list to process. For example, the load balance list generator 720 can select the second ESG E2 336 of the network overlay 600 of FIG. 6 to process.

At block 908, the example packet flow improver 208 adds the selected ESG to the ESG load balance list. For example, the load balance list generator 720 can add the second ESG E2 336 of the network overlay 600 of FIG. 6 to the ESG load balance list.

At block 910, the example packet flow improver 208 determines whether a number of ESGs in the ESG load balance list satisfies a threshold. For example, the load balance list generator 720 can determine that a number of ESGs in the ESG load balance list satisfies an ESG load balance list threshold. For example, the load balance list generator 720 can determine that two ESGs will not satisfy an ESG load balance list threshold of three or more ESGs.

If, at block 910, the example packet flow improver 208 determines that a number of ESGs in the ESG load balance list does not satisfy an ESG load balance list threshold, control returns to block 906 to select another ESG of interest in the generated list to process. If, at block 910, the example packet flow improver 208 determines that a number of ESGs in the ESG load balance list satisfies the ESG load balance list threshold, then, at block 912, the packet flow improver 208 selects an ESG of interest not currently in the ESG load balance list to process. For example, the load balance list generator 720 can select the eighth ESG E8 348 of the network overlay 600 of FIG. 6 to process.

At block 914, the example packet flow improver 208 determines whether a status parameter of the selected ESG satisfies a threshold. For example, the load balance list generator 720 can determine that a CPU utilization of 75% of the eighth ESG E8 348 does not satisfy a CPU utilization threshold of less than 30%. In another example, the load balance list generator 720 can determine that a switch load utilization of 25% of the eighth ESG E8 348 satisfies a switch load utilization threshold of less than 30%.

If, at block 914, the example packet flow improver 208 determines that the status parameter of the selected ESG does not satisfy a threshold, control proceeds to block 918 to determine whether there is another ESG of interest to process. If, at block 914, the example packet flow improver 208 determines that the status parameter of the selected ESG satisfies a threshold, then, at block 916, the packet flow improver 208 adds the selected ESG to the ESG load balance list. For example, the load balance list generator 720 can add the eighth ESG E8 348 to the ESG load balance list based on determining that the switch load utilization of 25% of the eighth ESG E8 348 satisfies the switch load utilization threshold.

At block 918, the example packet flow improver 208 determines whether there is another ESG of interest to process. For example, the load balance list generator 720 can determine that there are no more ESGs in the generated list of ESGs processed at block 902 to process. If, at block 918, the example packet flow improver 208 determines that there is another ESG of interest to process, control returns to block 912 to select another ESG of interest not currently in the ESG load balance list to process, otherwise the example method concludes.

FIG. 10 is a flowchart representative of an example method that can be performed by the example packet flow improver 208 of FIGS. 2 and 6-7 to generate an ESG load balance list for a network. The example process of FIG. 10 can be used to implement the operation of block 804 of FIG. 8. The example method begins at block 1002 when the example packet flow improver 208 generates a list of ESGs in a network. For example, the network analyzer 700 can generate a list including the first through the eighth ESGs E1-E8 334, 336, 338, 340, 342, 344, 346, 348 of the network overlay 600 of FIG. 6 based on obtained network configuration information from the network virtualizer 212 of FIGS. 2-6.

At block 1004, the example packet flow improver 208 obtains ESG monitoring information. For example, the network analyzer 700 can obtain ESG monitoring information from the network virtualizer 212. In such an example, the status analyzer 710 can determine a CPU utilization, a switch load utilization, etc., and/or a combination thereof for each one of the ESGs in the generated list based on the obtained ESG monitoring information.

At block 1006, the example packet flow improver 208 sorts the ESGs in the generated list based on the obtained ESG monitoring information. For example, the status analyzer 710 can sort (e.g., from highest to lowest, from lowest to highest, etc.) the ESGs in the generated list based on CPU utilization, switch load utilization, etc.

At block 1008, the example packet flow improver 208 selects an ESG of interest from the sorted list to process. For example, the load balance list generator 720 can select the second ESG E2 336 of the network overlay 600 of FIG. 6 to process based on the second ESG E2 336 having the lowest switch load utilization.

At block 1010, the example packet flow improver 208 adds the selected ESG to the ESG load balance list. For example, the load balance list generator 720 can add the second ESG E2 336 of the network overlay 600 of FIG. 6 to the ESG load balance list.

At block 1012, the example packet flow improver 208 determines whether a number of ESGs in the ESG load balance list satisfies a threshold. For example, the load balance list generator 720 can determine that a number of ESGs in the ESG load balance list satisfies an ESG load balance list threshold. For example, the load balance list generator 720 can determine that two ESGs will not satisfy an ESG load balance list threshold of three or more ESGs.

If, at block 1012, the example packet flow improver 208 determines that a number of ESGs in the ESG load balance list does not satisfy an ESG load balance list threshold, control returns to block 1008 to select another ESG of interest in the generated list to process. If, at block 1012, the example packet flow improver 208 determines that a number of ESGs in the ESG load balance list satisfies the ESG load balance list threshold, then, at block 1014, the packet flow improver 208 selects an ESG of interest not currently in the ESG load balance list to process. For example, the load balance list generator 720 can select the eighth ESG E8 348 of the network overlay 600 of FIG. 6 to process.

At block 1016, the example packet flow improver 208 determines whether a status parameter of the selected ESG satisfies a threshold. For example, the load balance list generator 720 can determine that a CPU utilization of 75% of the eighth ESG E8 348 does not satisfy a CPU utilization threshold of less than 30%. In another example, the load balance list generator 720 can determine that a switch load utilization of 25% of the eighth ESG E8 348 satisfies a switch load utilization threshold of less than 30%.

If, at block 1016, the example packet flow improver 208 determines that the status parameter of the selected ESG does not satisfy a threshold, control proceeds to block 1018 to determine whether there is another ESG of interest to process. If, at block 1016, the example packet flow improver 208 determines that the status parameter of the selected ESG satisfies a threshold, then, at block 1018, the packet flow improver 208 adds the selected ESG to the ESG load balance list. For example, the load balance list generator 720 can add the eighth ESG E8 348 to the ESG load balance list based on determining that the switch load utilization of 25% of the eighth ESG E8 348 satisfies the switch load utilization threshold.

At block 1020, the example packet flow improver 208 determines whether there is another ESG of interest to process. For example, the load balance list generator 720 can determine that there are no more ESGs in the generated list of ESGs processed at block 1002 to process. If, at block 1020, the example packet flow improver 208 determines that there is another ESG of interest to process, control returns to block 1014 to select another ESG of interest not currently in the ESG load balance list to process, otherwise the example method concludes.

FIG. 11 depicts example source code 1100 representative of example computer readable instructions that may be executed to implement the example packet flow improver 208 of FIGS. 2 and 6-7 that may be used to implement the examples disclosed herein. For example, the source code 1100 can be used to implement the method of FIGS. 8, 9 and/or 10. In the illustrated example, the packet flow improver 208 monitors hosts running ESGs and generates an ESG load balance list to implement ECMP for an L2 network. In the illustrated example, the source code 1100 runs (e.g., iteratively runs) while the while condition is true.

In the illustrated example, the packet flow improver 208 loads on ESG hosts based on obtained network configuration information. For example, the network analyzer 700 can load the first through the eighth ESGs E1-E8 334, 336, 338, 340, 342, 344, 346, 348 into a software array for processing. In the illustrated example, the packet flow improver 208 performs a sorting operation. For example, the status analyzer 710 can generate a list based on sorting the loaded ESG hosts based on alphanumerical ordering (e.g., E1, E2, E3, etc.). In another example, the status analyzer 710 can generate a list based on sorting the loaded ESG hosts based on a value of a status parameter such as CPU utilization, switch load utilization, etc.

In the illustrated example, the packet flow improver 208 processes each ESG in the sorted list. In the illustrated example, the packet flow improver 208 adds 50% of the ESGs regardless of their load (e.g., CPU utilization, switch load utilization, etc.). In addition, the example packet flow improver 208 can add additional ESGs if a value of a status parameter (host_load (H)) satisfies a threshold. For example, the load balance list generator 720 can add an additional ESG if the additional ESG has a CPU utilization less than a CPU utilization threshold of 30%. In another example, the load balance list generator 720 can add an additional ESG if the additional ESG has a switch load utilization less than a switch load utilization threshold of 30%. In response to the ESG load balance list being generated, the example packet flow improver 208 updates a policy of a physical hardware resource. For example, the policy adjustor 730 can update an ECMP routing hash policy on the first ToR switch A 110 of the first physical rack 102 of FIG. 1. For example, the policy adjustor 730 can update a routing table used by an ECMP routing hash policy on the first ToR Switch A 110 based on an ESG load balance list. In response to updating the policy of the physical hardware resource, the example source code 1100 breaks for 30 time units (e.g., 30 milliseconds, 30 seconds, etc.). Alternatively, any other time unit may be used. After the 30 time units have elapsed, the example source code 1100 executes again.

Figure 12:
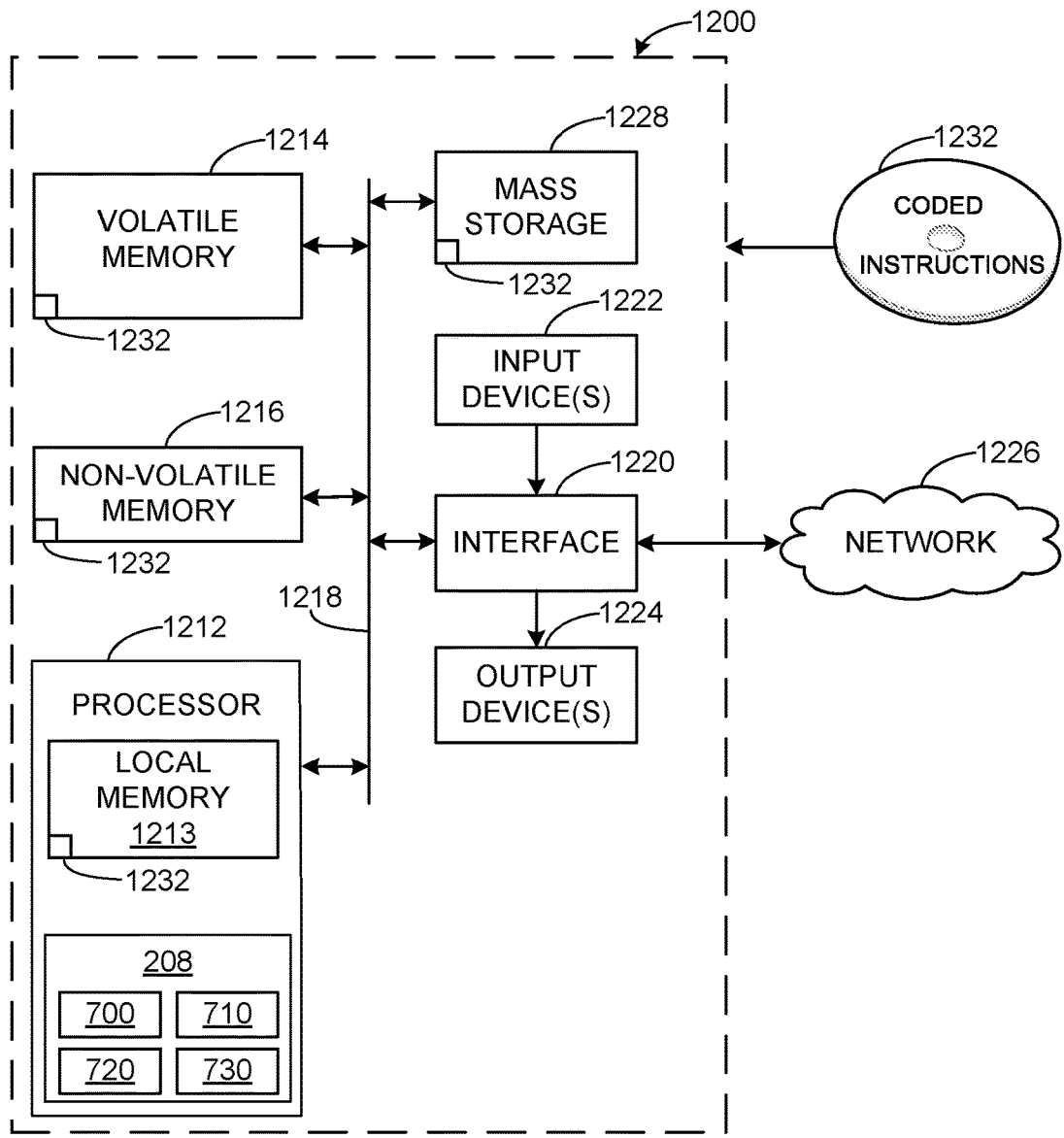
FIG. 12 is a block diagram of an example processing platform structured to execute machine-readable instructions to implement the methods of FIGS. 8-11 and/or the example packet flow improver of FIGS. 6-7.

FIG. 12 is a block diagram of an example processor platform 1200 capable of executing the instructions of FIGS. 8-11 to implement the example packet flow improver 208 of FIGS. 2 and 6-7. The processor platform 1200 can be, for example, a rackmount server or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer. The hardware processor may be a semiconductor based (e.g., silicon based) device. In this example, the processor 1212 implements the example network analyzer 700, the example status analyzer 710, the example load balance list generator 720, and the example policy adjustor 730.

The processor 1212 of the illustrated example includes a local memory 1213 (e.g., a cache). The processor 1212 of the illustrated example is in communication with a main memory including a volatile memory 1216 and a non-volatile memory 1216 via a bus 1218. The volatile memory 1216 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1216, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a peripheral component interconnect (PCI) express interface.

In the illustrated example, one or more input devices 1222 are connected to the interface circuit 1220. The input device(s) 1222 permit(s) a user to enter data and/or commands into the processor 1212. The input device(s) can be implemented by, for example, a keyboard, a button, a mouse, a touchscreen, a track-pad, a trackball, an isopoint device, and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1220 of the illustrated example, thus, typically includes a graphics driver card, a graphics driver chip, and/or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and DVD drives.

The coded instructions 1232 of FIGS. 8-11 may be stored in the mass storage device 1228, in the volatile memory 1216, in the non-volatile memory 1216, and/or on a removable non-transitory computer readable storage medium such as a CD or DVD.

From the foregoing, it will be appreciated that example methods, apparatus, systems, and articles of manufacture have been disclosed that optimize and/or otherwise improve packet flow between a source and a destination host. Examples disclosed herein adjust the packet flow based on generating an ESG load balance list. Examples disclosed herein describe generating the ESG load balance list by determining a number of ESGs in a network based on obtained network configuration information and processing each one of the number of ESGs based obtained monitoring information. Examples disclosed herein describe modifying a policy of a physical hardware resource based on a network routing configuration based on the ESG load balance list to enable L2 ECMP without additional specialized hardware. As a result, examples disclosed herein improve routing hardware used to execute the packet flow in the network by improving an ability of the routing hardware to distribute existing and new packet flows across more than one network resource such as an ESG. The routing hardware can be improved by executing an increasing number of packet flows as compared to prior systems where the packet flow can be congested due to L2 network fabric limitations preventing existing packet flows from being executed.

Examples disclosed herein improve packet flow among virtualized servers. An example apparatus includes a load balance list generator to identify abstracted network resources in a virtualized network based on a utilization status parameter of the abstracted network resources, generate a load balance list including the identified abstracted network resources, the load balance list including a number of the abstracted network resources satisfying a threshold, and generate a network routing configuration for data packets in the virtualized network based on the generated load balance list. The example apparatus further includes a policy adjustor to adjust a policy of a physical hardware resource corresponding to one or more of the abstracted network resources based on the network routing configuration to distribute a packet flow among the abstracted network resources. In the example apparatus, the utilization status parameter can include a processor utilization parameter or a switching utilization parameter. In the example apparatus, the network routing configuration can include at least one of an Internet protocol address, a port number, or a media access control address of the physical hardware resource. In the example apparatus, the policy can include an ECMP routing hash policy.

The example apparatus can further include a network analyzer to generate a list of abstracted network resources in the virtualized network based on obtained network configuration information, and a status analyzer to determine a value of the utilization status parameter for each one of the abstracted network resources in the list and sort each one of the abstracted network resources in the list based on the utilization status parameter.

In the example apparatus, generating the load balance list can include a network analyzer to generate a list of abstracted network resources in the virtualized network based on obtained network configuration information, a status analyzer to determine a value of the utilization status parameter for each one of the abstracted network resources in the list, compare the value to a utilization status threshold, and determine that the value satisfies the utilization status threshold based on the comparison, and the load balance list generator to add one or more of the abstracted network resource to the load balance list when the value satisfies the utilization status threshold.

In the example apparatus, generating the load balance list alternatively can include a network analyzer to generate a list of abstracted network resources in the virtualized network based on obtained network configuration information, a status analyzer to determine a value of the utilization status parameter for each one of the abstracted network resources in the list and sort the list based on the value, and the load balance list generator to add one or more abstracted network resources from the sorted list to the load balance list, compare a number of the added abstracted network resources to a load balance list threshold, and stop adding abstracted network resources when the load balance list threshold has been satisfied based on the comparison.

In disclosed examples herein, an example method includes identifying abstracted network resources in a virtualized network based on a utilization status parameter of the abstracted network resources, generating a load balance list including the identified abstracted network resources, the load balance list including a number of the abstracted network resources satisfying a threshold, generating a network routing configuration for data packets in the virtualized network based on the generated load balance list, and adjusting a policy of a physical hardware resource corresponding to one or more of the abstracted network resources based on the network routing configuration to distribute a packet flow among the abstracted network resources. In the example method, the utilization status can include a processor utilization parameter or a switching utilization parameter. In the example method, the network routing configuration can include at least one of an Internet protocol address, a port number, or a media access control address of the physical hardware resource. In the example method, the policy can include an equal-cost multi-path routing hash policy.

The example method can further include generating a list of abstracted network resources in the virtualized network based on obtained network configuration information, and determining a value of the utilization status parameter for each one of the abstracted network resources in the list and sort each one of the abstracted network resources in the list based on the utilization status parameter. In the example method, generating the load balance list can further include generating a list of abstracted network resources in the virtualized network based on obtained network configuration information, determining a value of the utilization status parameter for each one of the abstracted network resources in the list, compare the value to a utilization status threshold, and determine that the value satisfies the utilization status threshold based on the comparison, and adding one or more of the abstracted network resource to the load balance list when the value satisfies the utilization status threshold.

In the example method, generating the load balance list alternatively can include generating a list of abstracted network resources in the virtualized network based on obtained network configuration information, determining a value of the utilization status parameter for each one of the abstracted network resources in the list and sort the list based on the value, and adding one or more abstracted network resources from the sorted list to the load balance list, compare a number of the added abstracted network resources to a load balance list threshold, and stop adding abstracted network resources when the load balance list threshold has been satisfied based on the comparison.

In disclosed examples herein, an example non-transitory computer readable storage medium comprising instructions which, when executed, cause a machine to at least identify abstracted network resources in a virtualized network based on a utilization status parameter of the abstracted network resources, generate a load balance list including the identified abstracted network resources, the load balance list including a number of the abstracted network resources satisfying a threshold, generate a network routing configuration for data packets in the virtualized network based on the generated load balance list, and adjust a policy of a physical hardware resource corresponding to one or more of the abstracted network resources based on the network routing configuration to distribute a packet flow among the abstracted network resources. In the example non-transitory computer readable storage medium, the utilization status can include a processor utilization parameter or a switching utilization parameter. In the example non-transitory computer readable storage medium, the network routing configuration can include at least one of an Internet protocol address, a port number, or a media access control address of the physical hardware resource. In the example method, the policy can include an equal-cost multi-path routing hash policy.

The example non-transitory computer readable storage medium can further include instructions which, when executed, can cause the machine to at least generate a list of abstracted network resources in the virtualized network based on obtained network configuration information, and determine a value of the utilization status parameter for each one of the abstracted network resources in the list and sort each one of the abstracted network resources in the list based on the utilization status parameter. In the example non-transitory computer readable storage medium, generating the load balance list can include generating a list of abstracted network resources in the virtualized network based on obtained network configuration information, determining a value of the utilization status parameter for each one of the abstracted network resources in the list, compare the value to a utilization status threshold, and determine that the value satisfies the utilization status threshold based on the comparison, and adding one or more of the abstracted network resource to the load balance list when the value satisfies the utilization status threshold.

In the example non-transitory computer readable storage medium, generating the load balance list alternatively can include generating a list of abstracted network resources in the virtualized network based on obtained network configuration information, determining a value of the utilization status parameter for each one of the abstracted network resources in the list and sort the list based on the value, and adding one or more abstracted network resources from the sorted list to the load balance list, compare a number of the added abstracted network resources to a load balance list threshold, and stop adding abstracted network resources when the load balance list threshold has been satisfied based on the comparison.

Although certain example methods, apparatus, systems, and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a load balance list generator to:
in response to identification of virtualized network resources in a virtualized network, generate a load balance list including first ones of the virtualized network resources based on a utilization status parameter, the first ones of the virtualized network resources having respective values of the utilization status parameter that satisfy a first threshold;
in response to at least a number of the first ones of the virtualized network resources not satisfying a load balance list threshold, add second ones of the virtualized network resources to the load balance list, the second ones of the virtualized network resources having respective values of the utilization status parameter that satisfy a second threshold, the first threshold different from the second threshold; and
generate a network routing configuration for data packets in the virtualized network based on the first ones and the second ones of the virtualized network resources in the load balance list; and
a policy adjustor to adjust a policy of a physical hardware resource corresponding to one or more of the virtualized network resources based on the network routing configuration.

2. The apparatus of claim 1, wherein the utilization status parameter is a processor utilization parameter or a switching utilization parameter.

3. The apparatus of claim 1, wherein the network routing configuration includes at least one of an Internet protocol address, a port number, or a media access control address of the physical hardware resource.

4. The apparatus of claim 1, wherein the policy is an equal-cost multi-path routing hash policy.

5. The apparatus of claim 1, further including:
a network analyzer to identify the virtualized network resources in the virtualized network based on network configuration information; and
a status analyzer to determine the respective values of the utilization status parameter for the virtualized network resources.

6. The apparatus of claim 1, further including:
a network analyzer to identify the virtualized network resources in the virtualized network based on network configuration information;
a status analyzer to determine a first value of the utilization status parameter for a first virtualized network resource of the virtualized network resources, compare the first value to the first threshold, and determine that the first value satisfies the first threshold based on the comparison; and
the load balance list generator to add the first virtualized network resource to the load balance list when the first value satisfies the first threshold.

7. The apparatus of claim 1, further including:
a network analyzer to generate a first list of the virtualized network resources in the virtualized network based on network configuration information;
a status analyzer to sort the first list based on the values of the utilization status parameter for respective ones of the virtualized network resources in the first list; and
the load balance list generator to add one or more of the virtualized network resources from the first list to the load balance list, compare a number of the added ones of the virtualized network resources to the load balance list threshold, and stop adding ones of the virtualized network resources when the load balance list threshold has been satisfied based on the comparison.

8. A method comprising:
identifying virtualized network resources in a virtualized network;
generating a load balance list based on a utilization status parameter, the load balance list including first ones of the virtualized network resources having respective values of the utilization status parameter that satisfy a first threshold;
in response to at least a number of the first ones of the virtualized network resources not satisfying a load balance list threshold, adding second ones of the virtualized network resources to the load balance list, the second ones of the virtualized network resources having respective values of the utilization status parameter that satisfy a second threshold, the first threshold different from the second threshold;
generating a network routing configuration for data packets in the virtualized network based on the first ones and the second ones of the virtualized network resources in the load balance list;
adjusting a policy of a physical hardware resource corresponding to one or more of the virtualized network resources based on the network routing configuration; and
distributing a packet flow among the first ones and the second ones of the virtualized network resources based on the policy.

9. The method of claim 8, wherein the utilization status parameter is a processor utilization parameter or a switching utilization parameter.

10. The method of claim 8, wherein the network routing configuration includes at least one of an Internet protocol address, a port number, or a media access control address of the physical hardware resource.

11. The method of claim 8, wherein the policy is an equal-cost multi-path routing hash policy.

12. The method of claim 8, further including:
generating a first list of the virtualized network resources in the virtualized network based on network configuration information;
determining a first value of the utilization status parameter for a first virtualized network resource of the virtualized network resources;
comparing the first value to the first threshold;
determining that the first value satisfies the first threshold based on the comparison; and
in response to the first value satisfying the first threshold, adding the first virtualized network resource to the load balance list.

13. The method of claim 8, further including:
generating a first list of the virtualized network resources in the virtualized network based on network configuration information;

determining the respective values of the utilization status parameter for the virtualized network resources in the first list, compare the respective values to the first threshold, and determine whether the respective value satisfy the first threshold based on the comparison; and adding the first ones of the virtualized network resources to the load balance list when their respective values satisfy the first threshold.

14. The method of claim 8, further including:

generating a first list of the virtualized network resources in the virtualized network based on network configuration information;

determining the respective values of the utilization status parameter for the virtualized network resources in the first list;

sorting the first list based on the values;

adding one or more of the virtualized network resources from the first list to the load balance list;

comparing a number of the added ones of the virtualized network resources to the load balance list threshold; and ceasing adding ones of the virtualized network resources when the load balance list threshold has been satisfied based on the comparison.

15. A non-transitory computer readable storage medium comprising instructions which, when executed, cause a machine to at least:

in response to identification of virtualized network resources in a virtualized network, generate a load balance list based on a utilization status parameter, the load balance list including first ones of the virtualized network resources having respective values of the utilization status parameter that satisfy a first threshold;

in response to at least a number of the first ones of the virtualized network resources not satisfying a load balance list threshold, add second ones of the virtualized network resources to the load balance list, the second ones of the virtualized network resources having respective values of the utilization status parameter that satisfy a second threshold, the first threshold different from the second threshold;

generate a network routing configuration for data packets in the virtualized network based on the first ones and the second ones of the virtualized network resources in the load balance list; and adjust a policy of a physical hardware resource corresponding to one or more of the virtualized network resources based on the network routing configuration to cause distribution of a packet flow among the first ones and the second ones of the virtualized network resources.

16. The non-transitory computer readable storage medium of claim 15, wherein the utilization status parameter is a processor utilization parameter or a switching utilization parameter.

17. The non-transitory computer readable storage medium of claim 15, wherein the network routing configuration includes at least one of an Internet protocol address, a port number, or a media access control address of the physical hardware resource.

18. The non-transitory computer readable storage medium of claim 15, wherein the policy is an equal-cost multi-path routing hash policy.

19. The non-transitory computer readable storage medium of claim 15, wherein the instructions, when executed, cause the machine to at least:

generate a first list of the virtualized network resources based on network configuration information;

determine the respective values of the utilization status parameter for the virtualized network resources in the first list; and sort the first list based on the respective values of the utilization status parameter.

20. The non-transitory computer readable storage medium of claim 15, wherein the instructions, when executed, cause the machine to:

generate a first list of the virtualized network resources based on network configuration information;

determine the respective values of the utilization status parameter for the virtualized network resources in the first list;

compare the respective values to the first threshold;

determine whether the respective values satisfy the first threshold based on the comparison; and add first ones of the virtualized network resources to the load balance list when their respective value satisfies the first threshold.

21. The non-transitory computer readable storage medium of claim 15, wherein the instructions, when executed, cause the machine to:

generate a first list of the virtualized network resources in the virtualized network based on network configuration information;

determine the respective values of the utilization status parameter for the virtualized network resources in the first list and sort the first list based on the respective values;

add one or more of the virtualized network resources from the first list to the load balance list;

compare a number of the added ones of the virtualized network resources to the load balance list threshold; and stop adding ones of the virtualized network resources when the load balance list threshold has been satisfied based on the comparison.

* * * * *